United States Patent
Cohn et al.

(10) Patent No.: US 11,936,524 B2
(45) Date of Patent: *Mar. 19, 2024

(54) PROVIDING EXTENDIBLE NETWORK CAPABILITIES FOR MANAGED COMPUTER NETWORKS

(71) Applicant: Amazon Technologies, Inc., Seattle, WA (US)

(72) Inventors: Daniel T. Cohn, Oakland, CA (US); Eric Jason Brandwine, Haymarket, VA (US); Andrew J. Doane, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,317

(22) Filed: Nov. 14, 2022

(65) Prior Publication Data
US 2023/0082172 A1 Mar. 16, 2023

Related U.S. Application Data

(63) Continuation of application No. 17/132,819, filed on Dec. 23, 2020, now Pat. No. 11,502,903, which is a
(Continued)

(51) Int. Cl.
*H04L 41/0816* (2022.01)
*H04L 9/40* (2022.01)
(Continued)

(52) U.S. Cl.
CPC .......... *H04L 41/0816* (2013.01); *H04L 41/08* (2013.01); *H04L 41/0806* (2013.01);
(Continued)

(58) Field of Classification Search
None
See application file for complete search history.

(56) References Cited

U.S. PATENT DOCUMENTS 6,330,562 B1 12/2001 Boden
7,865,586 B2 1/2011 Cohn
(Continued)

OTHER PUBLICATIONS

Outbound Rules (Service Blocking). Posted on <http://documentation.netgear.com/dgfv338/enu/202-10161-02/DGFV338.sub- .--RM-06-05.html> on Apr. 18, 2012.
(Continued)

*Primary Examiner* — Scott B Christensen
(74) *Attorney, Agent, or Firm* — Robert C. Kowert; Kowert, Hood, Munyon, Rankin & Goetzel, P.C.

(57) ABSTRACT

Techniques are described for managing communications between multiple computing nodes, such as for computing nodes that are part of managed virtual computer networks provided on behalf of users or other entities. In some situations, one or more of the computing nodes of a managed virtual computer network is configured to perform actions to extend capabilities of the managed virtual computer network to other computing nodes that are not part of the managed virtual computer network, such as by forwarding communications between computing nodes of the managed virtual computer network and the other external computing nodes so as to enable the other external computing nodes to participate in the managed virtual computer network. In some situations, the computing nodes may include virtual machine nodes hosted on one or more physical computing machines or systems, such as by or on behalf of one or more users.

20 Claims, 11 Drawing Sheets

Related U.S. Application Data continuation of application No. 15/627,067, filed on Jun. 19, 2017, now Pat. No. 10,880,165, which is a continuation of application No. 14/721,878, filed on May 26, 2015, now Pat. No. 9,686,349, which is a continuation of application No. 12/414,264, filed on Mar. 30, 2009, now Pat. No. 9,043,463.

(51) Int. Cl.
| | |
|---|---|
| H04L 41/08 | (2022.01) |
| H04L 41/0806 | (2022.01) |
| H04L 61/103 | (2022.01) |
| H04L 61/251 | (2022.01) |
| H04L 61/5007 | (2022.01) |
| H04L 67/10 | (2022.01) |
| H04L 67/51 | (2022.01) |
| H04L 101/604 | (2022.01) |
| H04L 101/659 | (2022.01) |

(52) U.S. Cl.
CPC ...... *H04L 61/5007* (2022.05); *H04L 63/0272* (2013.01); *H04L 67/10* (2013.01); *H04L 67/51* (2022.05); *H04L 61/103* (2013.01); *H04L 61/251* (2013.01); *H04L 2101/604* (2022.05); *H04L 2101/659* (2022.05)

(56) References Cited

U.S. PATENT DOCUMENTS

| | | | |
|---|---|---|---|
| 9,043,463 | B1 | 5/2015 | Cohn et al. |
| 9,686,349 | B2 | 6/2017 | Cohn et al. |
| 10,880,165 | B2 | 12/2020 | Cohn et al. |
| 11,502,903 | B2 | 11/2022 | Cohn et al. |
| 2002/0042875 | A1 | 4/2002 | Shukla |
| 2003/0233452 | A1 | 12/2003 | Msaufer |
| 2006/0056605 | A1 | 3/2006 | Whitfield et al. |
| 2006/0133274 | A1 | 6/2006 | Lee et al. |
| 2007/0061441 | A1 | 3/2007 | Landis et al. |
| 2007/0157303 | A1 | 7/2007 | Pankratov |
| 2007/0280243 | A1 | 12/2007 | Wray et al. |
| 2008/0225875 | A1 | 9/2008 | Wray et al. |
| 2008/0240122 | A1 | 10/2008 | Richardson et al. |
| 2009/0003353 | A1 | 1/2009 | Ding et al. |
| 2009/0046733 | A1 | 2/2009 | Bueno et al. |
| 2009/0199177 | A1 | 8/2009 | Edwards et al. |
| 2009/0248896 | A1 | 10/2009 | Cohn |

OTHER PUBLICATIONS

"Anycast," retrieved on Mar. 16, 2009, from http://en/wikipedia.org/wiki/Anycast, 4 pages.

"Load Balancing (Computing)," retrieved on Mar. 16, 2009, from http://en.wikipedia.org/wiki/Load.sub.-balancing.sub.-(computing), 5 pages.

"Mobile IP," retrieved on Dec. 19, 2008, from http://en.wikipedia.org/wiki/Mobile.sub.--ip, 3 pages.

"Round Robin DNS," retrieved on Dec. 17, 2008, from http://en.wikipedia.org/wiki/Round.sub.-robin.sub.--DNS, 2 pages.

"Virtual IP Address," retrieved on Dec. 17, 2008, from http://www.answers.com/topic/virtual-ip-address-1, 2 pages.

"VMware VMotion," retrieved on Mar. 16, 2009, from http://www.vmware.com/products/vi/vc/vmotion.html. 2 pages.

"VMWare Storage VMotion," retrieved on Mar. 16, 2009, from http://www.vmware.com/products/vi/storage.sub.-vmotion.html. 2 pages.

Clark, C., et al., "Live Migration of Virtual Machines," retrieved on Mar. 16, 2009, from http://www.cl.cam.ac.uk/research/srg/netos/papers/2005-migration-nsdi-pre- .pdf, 14 pages.

"NAT (Network Address Translation)", Posted at <techterms.com/definition/nat> on Feb. 9, 2008. (Year: 2008).

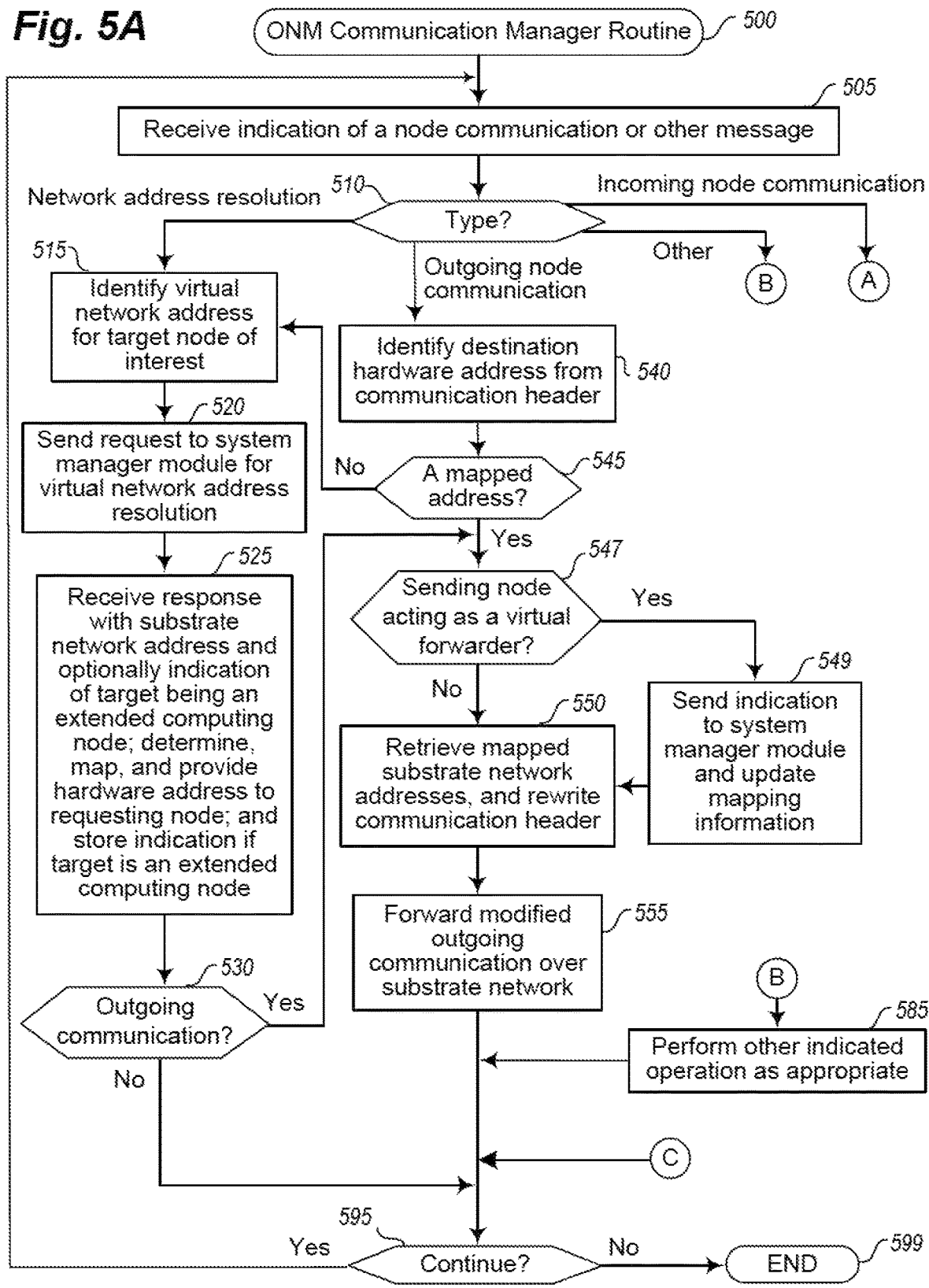

PROVIDING EXTENDIBLE NETWORK CAPABILITIES FOR MANAGED COMPUTER NETWORKS

This application is a continuation of U.S. patent application Ser. No. 17/132,819, filed Dec. 23, 2020, which is a continuation of U.S. patent application Ser. No. 15/627,067, filed Jun. 19, 2017, now U.S. Pat. No. 10,880,165, which is a continuation of U.S. patent application Ser. No. 14/721,878, filed May 26, 2015, now U.S. Pat. No. 9,686,349, which is a continuation of U.S. patent application Ser. No. 12/414,264, filed Mar. 30, 2009, now U.S. Pat. No. 9,043,463, which are hereby incorporated by reference herein their entirety.

BACKGROUND

Many companies and other organizations operate computer networks that interconnect numerous computing systems to support their operations, with the computing systems alternatively co-located (e.g., as part of a private local network) or instead located in multiple distinct geographical locations (e.g., connected via one or more private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 5A-5B illustrate a flow diagram of an example embodiment of an ONM Communication Manager routine.

DETAILED DESCRIPTION

Figure 1:
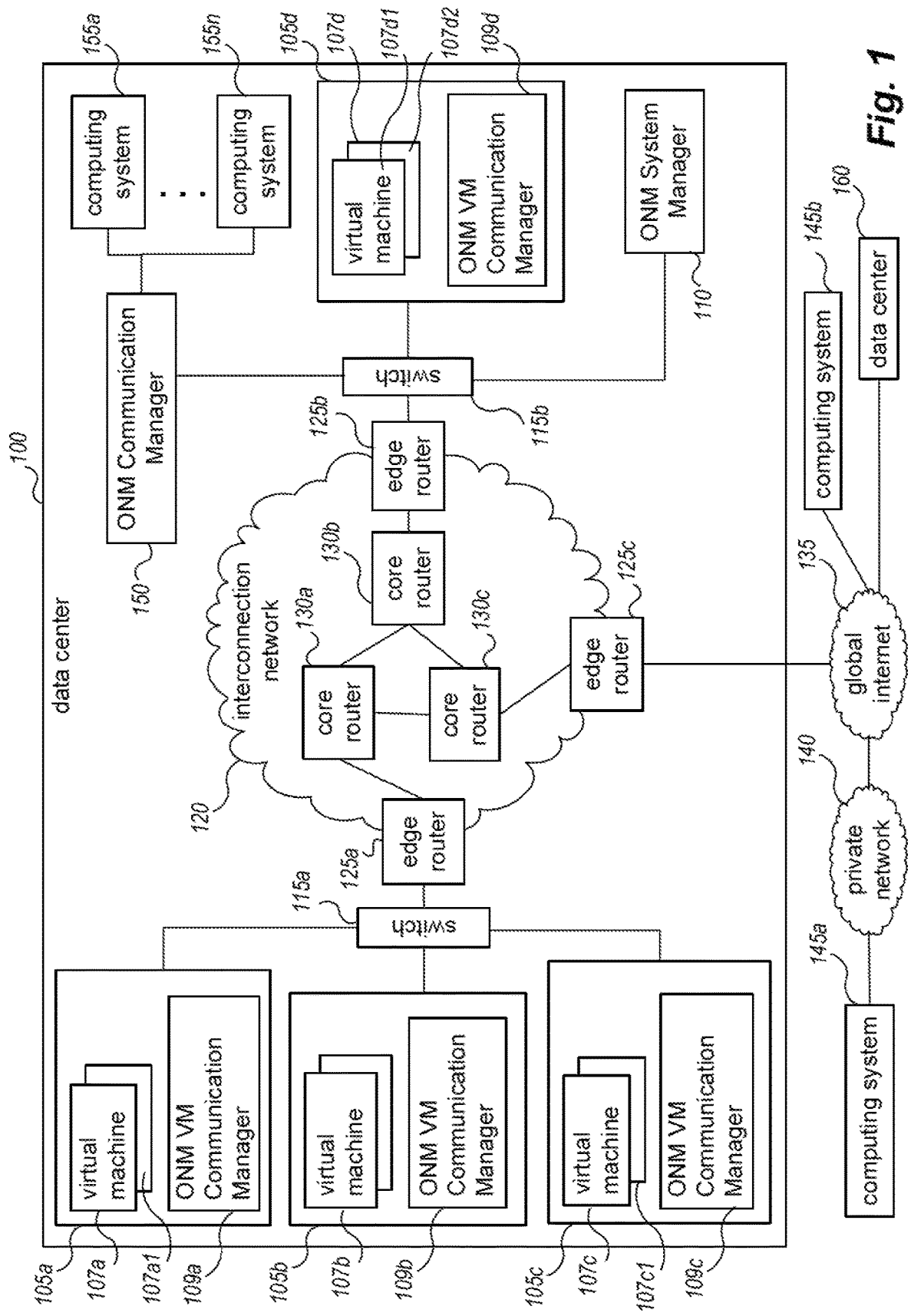
FIG. 1 is a network diagram illustrating an example embodiment of configuring and managing communications between computing nodes belonging to a virtual computer network.

Techniques are described for managing communications between multiple computing nodes, such as for computing nodes that are part of managed virtual computer networks provided on behalf of users or other entities. In at least some embodiments, the techniques enable a user or other entity to configure a provided managed virtual computer network so that one or more of the computing nodes of the managed virtual computer network act to extend capabilities of the managed virtual computer network to other computing nodes that are not part of the managed virtual computer network, or that otherwise do not have access to those capabilities. For example, in at least some embodiments, one or more configured computing nodes of a managed virtual computer network may act in a manner similar to a router or other networking device, such as to enable other computing nodes external to the managed virtual computer network to act as part of the managed virtual computer network (e.g., by the configured computing node(s) forwarding communications back and forth between the computing nodes of the managed virtual computer network and the other external computing nodes). Thus, such configured computing nodes of a managed virtual computer network that facilitate extending network capabilities may take various actions to provide such network capability extensions, and a system that manages such a provided virtual computer network may further support such network capabilities extension actions of such configured computing nodes in various manners, including by managing communications sent to and from those configured computing nodes. In at least some embodiments, some or all of the described techniques for supporting such network capabilities extensions by configured computing nodes and other actions in managing virtual computer networks are automatically performed by embodiments of an Overlay Network Manager system, as described in greater detail below.

A virtual local network or other virtual computer network between multiple computing nodes may be provided in various ways in various embodiments, such as by creating an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a virtual computer network that is provided and managed by an embodiment of the Overlay Network Manager system and that is overlaid on a substrate network, each computing node may be assigned one or more virtual network addresses for the managed virtual computer network that are unrelated to those computing nodes' substrate network addresses, such as from a range of virtual network addresses used for the managed virtual computer network—in at least some embodiments and situations, the virtual computer network being managed may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual computer network. Additional details related to the provision of such an overlay virtual computer network are included below.

In at least some embodiments, an embodiment of an Overlay Network Manager ("ONM") system provides overlay virtual computer networks to customers and other users, such as by providing and using numerous computing nodes that are in one or more geographical locations (e.g., in one or more data centers) and that are inter-connected via one or more intermediate physical networks. The ONM system may use various communication manager modules at the edge of the one or more intermediate physical networks to manage communications for the various overlay virtual computer networks as they enter and leave the intermediate physical network(s), and may use one or more system manager modules to coordinate other operations of the ONM system. For example, to enable the communication manager modules to manage communications for the overlay virtual computer networks being provided, the ONM system may track and use various information about the computing nodes of each virtual computer network, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide virtual computer networks to users and other entities in a desired manner, the ONM system allows users and other entities to interact with the ONM system in at least some embodiments to configure a variety of types of information for virtual computer networks that are managed by the ONM system on behalf of the users or other entities, and may track and use such configuration information as part of managing those virtual computer networks. The configuration information for a particular virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; particular virtual network addresses to associate with particular computing nodes or particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; etc. In addition, the configuration information for a virtual computer network may be specified by a user or other entity in various manners in various embodiments, such as by an executing program of the user or other entity that interacts with an API ("application programming interface") provided by the ONM system for that purpose and/or by a user that interactively uses a GUI ("graphical user interface") provided by the ONM system for that purpose.

In addition, as previously noted, the capabilities of virtual computer networks managed by the ONM system may be extended in various manners in various embodiments, with the ONM system performing various actions to support such network capability extensions. Computing nodes that are part of a managed virtual computer network are referred to herein in at least some situations as "network computing nodes," a network computing node of a virtual computer network that performs actions to extend capabilities of the virtual computer network to other external computing nodes is referred to herein in at least some situations as a "virtual forwarder node," and other computing nodes external to a virtual computer network to which network capabilities are extended by a virtual forwarder node are referred to herein in at least some situations as "extended computing nodes." As described in greater detail below, in some embodiments, a virtual forwarder node that is part of a virtual computer network managed by the ONM system may take various actions to extend capabilities of the virtual computer network to one or more other extended computing nodes that are not part of the virtual computer network, such as for other computing nodes that are part of one or more other virtual computer networks managed by the ONM system, or instead for other computing nodes that are not managed by the ONM system (e.g., that are external to a substrate network on which the ONM system overlays virtual computer networks that are being managed). In other embodiments, a virtual forwarder node that is part of a virtual computer network managed by the ONM system may instead take various actions to facilitate communications between computing nodes that are part of different subsets of a single virtual computer network (e.g., to act as a gateway, to provide VPN functionality, to provide encryption/decryption functionality, etc.), or to more generally extend capabilities of some of the computing nodes of the virtual computer network to other of the computing nodes of the virtual computer network.

In some embodiments, the ONM system supports network capability extensions by enabling a user or other entity associated with a virtual computer network to interact with the ONM system to configure various information about one or more virtual forwarder nodes of the virtual computer network, and the ONM system may track and use such information as part of managing that virtual computer network. The network capability extension configuration information for a virtual computer network may include, for example, various types of information, including the following non-exclusive list: one or more indicated network computing nodes of the virtual computer network that each acts as a virtual forwarder node to extend one or more specified types of network capabilities to other external extended computing nodes (e.g., to act in a manner similar to a network router device to forward communications between the network computing nodes and extended computing nodes); information about one or more extended computing nodes for the virtual computer network (e.g., one or more extended computing nodes that are associated with a particular virtual forwarder node); etc. In other embodiments, a user or other entity may configure particular network computing nodes of a virtual computer network to act as virtual forwarder nodes and may configure particular external computing nodes to be extended computing nodes of the virtual computer network, but without interacting with or otherwise notifying the ONM system of some or all of those configurations—in at least some such embodiments, modules of the ONM system may automatically discover and support such configured virtual forwarder nodes in various manners, as discussed in greater detail below.

Furthermore, network communication capabilities may be extended by a virtual forwarder node of a virtual computer network in various manners and for various purposes in various embodiments. For example, as previously noted, a particular virtual forwarder node may forward communications between network computing nodes of a virtual computer network that is managed by an ONM system and other extended computing nodes that are not managed by the ONM system, such as to allow the extended computing nodes to operate as part of the virtual computer network for at least some purposes. In such situations, the virtual forwarder node may operate only to assist in exchanging communications between other network and extended computing nodes in this manner, or may instead also operate as an independent network computing node of the virtual computer network (e.g., to also send and receive its own communications). In addition, in at least some embodiments and situations, a virtual forwarder node may perform additional functionality with respect to the communications that it receives to be forwarded, such as to provide one or more of the following non-exclusive list of types of functionality: acting as a VPN endpoint, acting as a concentrator, acting as a load balancer, acting as a firewall, acting as a proxy, performing network traffic capture, performing network traffic engineering, etc.

The ONM system may take various actions to support a virtual forwarder node that is specified for a particular virtual computer network. For example, in at least some embodiments, the ONM system may provide various security-related protections for network computing nodes of managed virtual computer networks, such as to enable a communication to be delivered to a network computing node only if the communication is directed to that network computing node by another authorized computing node (e.g., by another network computing node of the same virtual computer network), and such as to enable a communication to be sent from a network computing node only if the communication is designated as being from the sending network computing node (e.g., to prevent spoofing of communications). However, in at least some such embodiments, virtual forwarder nodes may be supported in various manners by altering such security-related protections to enable the virtual forwarder nodes to perform other operations, including operations on behalf of other extended computing nodes that are not part of the managed virtual computer network, such as to forward incoming communications over the virtual computer network from extended computing nodes and to receive outgoing communications from other network computing nodes that are intended for the extended computing nodes.

As one example, the ONM system may track which extended computing nodes are associated with a particular virtual forwarder node, and allow incoming communications that are sent from those extended computing nodes to be passed through the virtual forwarder node and to destination network computing nodes of the managed virtual computer network. Similarly, the ONM system may direct outgoing communications intended for such extended computing nodes from source network computing nodes of the managed virtual computer network to an associated virtual forwarder node for handling, and may allow such outgoing communications to be passed through the virtual forwarder node. In this manner, the ONM system may facilitate actions of a virtual forwarder node in extending network capabilities to external extended computing nodes by allowing the virtual forwarder node to manage at least some communications sent to or from those extended computing nodes. Furthermore, the providing of extended network capabilities may be performed in a manner that is transparent to other network computing nodes of the virtual computer network, such that the other network computing nodes of the virtual computer network may be unaware of the actions of the virtual forwarder nodes, or more generally that the extended computing nodes are not part of the virtual computer network as managed by the ONM system. Additional details related to providing extended network capabilities for a virtual computer network are included below.

In at least some embodiments, the computing nodes between which communications are managed may be physical computing systems and/or may be virtual machines that are each hosted on one or more physical computing systems, and the communications may include transmissions of data (e.g., messages, packets, frames, streams, etc.) in various formats. As previously noted, some or all computing nodes used for a particular managed overlay virtual computer network may in some embodiments be provided by the ONM system for use by users, while in other embodiments some or all such computing nodes may instead be provided by a user who uses those computing nodes. Furthermore, in at least some situations, an embodiment of the ONM system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity. In addition, in some situations, an embodiment of the ONM system may be part of or otherwise affiliated with a configurable network service (or "CNS") that provides configurable private computer networks to multiple customers or other users of the service, such as by using cloud computing techniques with multiple computing systems that are provided on multiple physical networks (e.g., multiple physical computing systems and networks within a data center).

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks. As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. More generally, in some embodiments when implementing a first overlay network using a second substrate network, an N-bit network address that is specified for the first overlay network in accordance with a first network addressing protocol may be embedded as part of another M-bit network address that is specified for the second substrate network in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N").

Various benefits may be obtained from embedding virtual network address information in substrate network addresses for an underlying physical substrate network, including enabling an overlay of the virtual computer network on the physical substrate network without encapsulating communications or configuring physical networking devices of the physical substrate network, as discussed in greater detail below. Furthermore, other information may similarly be embedded in the larger physical network address space for a communication between computing nodes in at least some embodiments and situations, such as an identifier specific to a particular virtual computer network that includes those computing nodes (e.g., a virtual computer network for a user or other entity on whose behalf those computing nodes operate). Additional details related to provision of such virtual computer networks via use of overlay networks are included below.

Furthermore, in addition to managing communications for provided virtual networks, the ONM system may provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, computing nodes may easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, various changes to an underlying substrate network are also supported—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

For illustrative purposes, some embodiments are described below in which specific types of computing nodes, networks, communications, extensions of network capabilities, and configuration operations are performed. These examples are provided for illustrative purposes and are simplified for the sake of brevity, and the inventive techniques may be used in a wide variety of other situations, some of which are discussed below.

FIG. 1 is a network diagram illustrating an example embodiment of configuring and managing communications between computing nodes belonging to a virtual computer network, so that the communications are overlaid on one or more intermediate physical networks in a manner transparent to the computing nodes. In this example, the configuring and managing of the communications is facilitated by a system manager module and multiple communication manager modules of an example embodiment of the ONM system. The example ONM system may be used, for example, in conjunction with a publicly accessible program execution service (not shown) and/or publicly accessible configurable network service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 100 with multiple physical computing systems operated on behalf of the ONM system. The example data center 100 is connected to a global internet 135 external to the data center 100, which provides access to one or more computing systems 145a via private network 140, to one or more other globally accessible data centers 160 that each have multiple computing systems (not shown), and to one or more other computing systems 145b. The global internet 135 may be, for example, a publicly accessible network of networks (possibly operated by various distinct parties), such as the Internet, and the private network 140 may be, for example, a corporate network that is wholly or partially inaccessible from computing systems external to the private network 140. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems (not shown) to manage communications for the associated computing systems 155a-155n, and a System Manager module 110 that executes on one or more computing systems (not shown). In this example, each physical computing system 105a-105d hosts multiple virtual machine computing nodes and includes an associated virtual machine ("VM") communication manager module (e.g., as part of a virtual machine hypervisor monitor for the physical computing system), such as VM Communication Manager module 109a and virtual machines 107a on host computing system 105a, and such as VM Communication Manager module 109d and virtual machines 107d on host computing system 105d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may have various forms, such as, for example, a proxy computing device, firewall device, or networking device (e.g., a switch, router, hub, etc.) through which communications to and from the physical computing systems travel. In other embodiments, all or none of the physical computing systems at the data center may host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The illustrated System Manager module and Communication Manager modules may perform at least some of the described techniques in order to configure, authorize and otherwise manage communications sent to and from associated computing nodes, including to support various extensions of network capabilities for one or more virtual computer networks that are provided using various of the computing nodes. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay a particular virtual network over one or more intermediate physical networks that are used as a substrate network, such as over the interconnection network 120.

Thus, as one illustrative example, one of the virtual machine computing nodes 107a on computing system 105a (in this example, virtual machine computing node 107a1) may be part of the same virtual local computer network as one of the virtual machine computing nodes 107d on computing system 105d (in this example, virtual machine computing node 107d1), such as with the IPv4 networking protocol being used to represent the virtual network addresses for the virtual local network. The virtual machine 107a1 may then direct an outgoing communication (not shown) to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual computer networks and/or entities with which the computing nodes are associated), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a previous request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2D provide examples of doing such communication management in some embodiments, including to manage communications so as to support extending network capabilities for virtual computer networks.

When Communication Manager module 109d receives the communication via the interconnection network 120 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2D. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d may also perform additional steps related to security, as discussed in greater detail elsewhere.

While the example computing nodes 107a1 and 107d1 were both located in data center 100 in this example, the ONM system may also optionally provide and manage virtual computer networks that have a span reaching beyond the data center 100 in some embodiments, such as if one or more other data centers 160 also provide computing nodes that are available for use by the example ONM system, and a particular virtual computer network includes network computing nodes at two or more such data centers at two or more distinct geographical locations. Multiple such data centers or other geographical locations of one or more computing nodes may be inter-connected in various manners, including the following: directly via one or more public networks; via a private connection, not shown (e.g., a dedicated physical connection that is not shared with any third parties, a VPN or other mechanism that provides the private connection over a public network, etc.); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160. A particular virtual computer network managed by the ONM system may optionally have a span beyond the data center 100 in other manners in other embodiments as well, such as if one or more other Communication Manager modules at the data center 100 are placed between edge router 125c and the global internet 135, or instead based on one or more other Communication Manager modules external to the data center 100 (e.g., if another Communication Manager module is made part of private network 140, so as to manage communications for computing systems 145a over the global internet 135 and private network 140; etc.). Thus, for example, if an organization operating private network 140 desires to virtually enlarge its private computer network 140 to include one or more of the computing nodes of the data center 100, it may do so by implementing one or more Communication Manager modules as part of the private network 140 (e.g., as part of the interface between the private network 140 and the global internet 135)— in this manner, computing systems 145a within the private network 140 may communicate with those data center computing nodes as if those data center computing nodes were part of the private computer network.

In addition, while not illustrated in FIG. 1, in some embodiments the various Communication Manager modules may take further actions to facilitate extending network capabilities for a virtual computer network to one or more other extended computing nodes that are not part of the virtual computer network, whether for other extended computing nodes that are local to data center 100 and/or that are at a remote location. For example, with respect to the previous example of the managed virtual computer network that included network computing nodes 107a1 and 107d1, that same virtual computer network may further include other network computing nodes, such as computing system 155a and virtual machine computing node 107c1 on physical computing system 105c. However, other computing nodes at data center 100 and/or in other locations may not be part of that managed virtual computer network (and further may not even be under the control of the ONM system). Some such other computing nodes that are external to the example managed virtual computer network may nonetheless receive capabilities of the managed virtual computer network that are extended to them by one or more of the computing nodes of the managed virtual computer network acting as virtual forwarder nodes, with such network capabilities extensions being supported by the modules of the ONM system. Consider a situation, for example, in which network computing node 107c1 is configured to act as a virtual forwarder node in order to extend capabilities of the managed virtual computer network to other extended computing nodes, such as to computing system 155n, to virtual machine computing node 107d2 on physical computing system 105d, and to one of the computing systems 145b. If so, those other extended computing nodes may be configured to participate in the managed virtual computer network in various manners. For example, security permissions for the managed virtual computer network may enable some or all of the network computing nodes of the managed virtual computer network to receive and send communications to computing systems that are outside of the managed virtual computer network, such as for any Internet-accessible computing systems. If so, virtual forwarder computing node 107c1 may be one of those externally accessible nodes, such as if the substrate network address corresponding to virtual forwarder computing node 107c1 is made publicly available and used by such other outside computing systems to send communications to the computing node 107c1 over the interconnection network 120.

Accordingly, one of the extended computing nodes (e.g., computing system 155n) may be provided with the virtual network addresses used by one or more of the network computing nodes of the managed virtual computer network, and further configured to treat virtual forwarder computing node 107c1 as a router or proxy or other intermediate destination for sending communications to such network computing nodes. If so, that extended computing node may create a communication that is intended for one of the network computing nodes of the managed virtual computer network, and direct that communication to that network computing node via the intermediate virtual forwarder computing node 107c1 (e.g., by using computing node 107c1's substrate network address to direct the communication to computing node 107c1 as an initial intermediate destination, and by using the virtual network address of the destination network computing node to indicate that ultimate destination). Since the modules of the ONM system are configured in this example to allow outside computing systems to communicate with virtual forwarder computing node 107c1, the communication will be delivered to computing node 107c1 by the interconnection network 120 and Communication Manager module 109c in the same manner as any other communication from an outside computing system, with the modules of the ONM system being unaware in at least some situations that the delivered communication is from an extended computing node or is otherwise different from any other communication from an outside computing system.

After virtual machine computing node 107c1 receives the communication from the extended computing node, it determines the ultimate destination of the communication based on the destination virtual network address included in the communication. The virtual machine computing node 107c1 then forwards the received communication as a new outgoing communication to that destination network computing node. For example, if the destination virtual network address corresponds to destination network computing node 107d1, the forwarding of the communication from virtual forwarder computing node 107c1 to destination network computing node 107d1 will be performed in a manner similar to that previously described for network computing node 107a1 sending a communication to network computing node 107d1, including for the new forwarded communication to pass through Communication Manager module 109c, the interconnection network 120, and Communication Manager module 109d on the way to network computing node 107d1. Furthermore, the virtual forwarder computing node 107c1 may in at least some embodiments modify the communication header of the forwarded communication in a manner similar to that of a network router or other networking device, such as to use a virtual network address associated with the sending extended computing node as a source virtual network address for the forwarded communication, such that the forwarded communication received by the destination network computing node 107d1 appears to be sent from that extended computing node as part of the virtual computer network, and with the actions of the virtual forwarder computing node 107c1 optionally being transparent to the destination network computing node 107d1. In such situations, the modules of the ONM system may be configured to support such actions by the virtual forwarder computing node 107c1 in various manners, such as by allowing virtual forwarder computing node 107c1 to send communications over the managed virtual computer network that include source virtual network address information for computing nodes other than computing node 107c1 (e.g., for extended computing nodes that have previously been configured to be associated with the virtual forwarder computing node, or instead for any other computing nodes), and for destination Communication Manager module 109d to re-construct the forwarded communication after it is received from the substrate network to reflect its form as initially forwarded by computing node 107c1 (e.g., with the virtual network address of the sending extended computing node shown as the source virtual network address in the re-constructed communication). The virtual forwarder computing node 107c1 may optionally also take other actions for the forwarded communication before sending it to the ultimate destination network computing node in at least some embodiments and situations, such as to modify a TTL ("time to live") hop value for the communication, to perform other types of functionality as discussed elsewhere, etc.

In a similar manner, the network computing nodes of the virtual computer network may send outgoing communications to extended computing nodes by using the virtual forwarder computing node 107c1 as an intermediary, such as by including a destination virtual network address in a sent communication that is associated with an extended computing node supported by the virtual forwarder computing node 107c1. In such situations, the ONM system modules may be configured to forward such a communication to the virtual forwarder computing node 107c1, even if the specified destination virtual network address for the communication does not match virtual forwarder computing node 107c1's virtual network address. When the virtual forwarder computing node 107c1 receives such a communication, it may take similar actions to forward the received communication on to the intended destination extended computing node, optionally after modifying the communication header or taking other actions as part of the forwarding. The examples of FIGS. 2C-2D provide additional details regarding extending network capabilities to computing nodes external to a managed virtual computer network.

By supporting extensions of network capabilities using the described techniques, the ONM system provides various benefits. For example, because the various Communication Manager modules manage the overlay virtual network, modifications are not needed to the interconnection network 120 or switches 115a-115b to support the network capability extensions. In addition, by allowing virtual forwarder computing nodes to take various types of actions, those computing nodes may be enable to perform a variety of types of functionality for a virtual computer network that may not be directly provided by an embodiment of the ONM system.

Figure 2A:
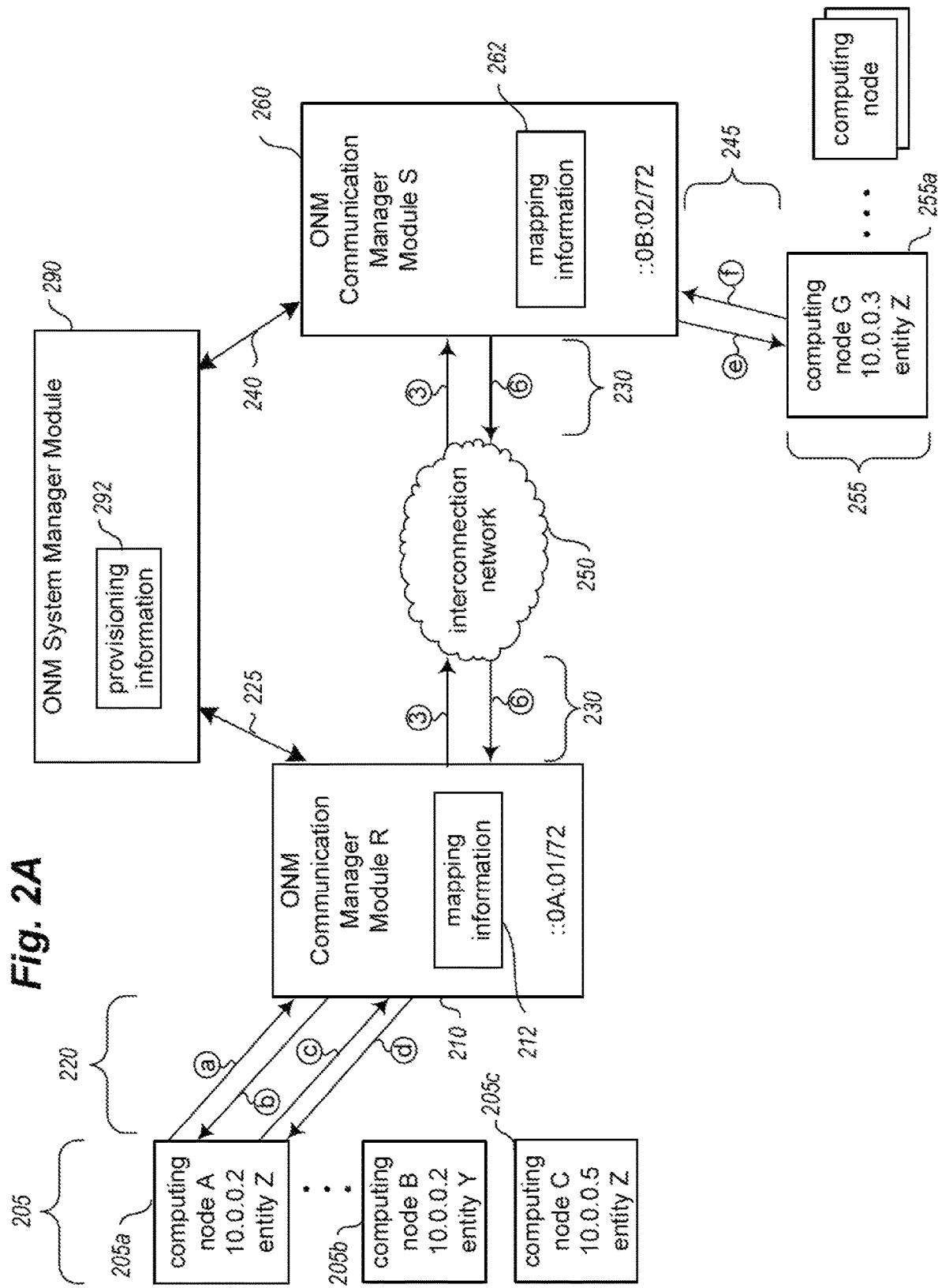
FIGS. 2A-2D illustrate examples of managing communications between computing nodes of a virtual overlay computer network.
Figure 2B:
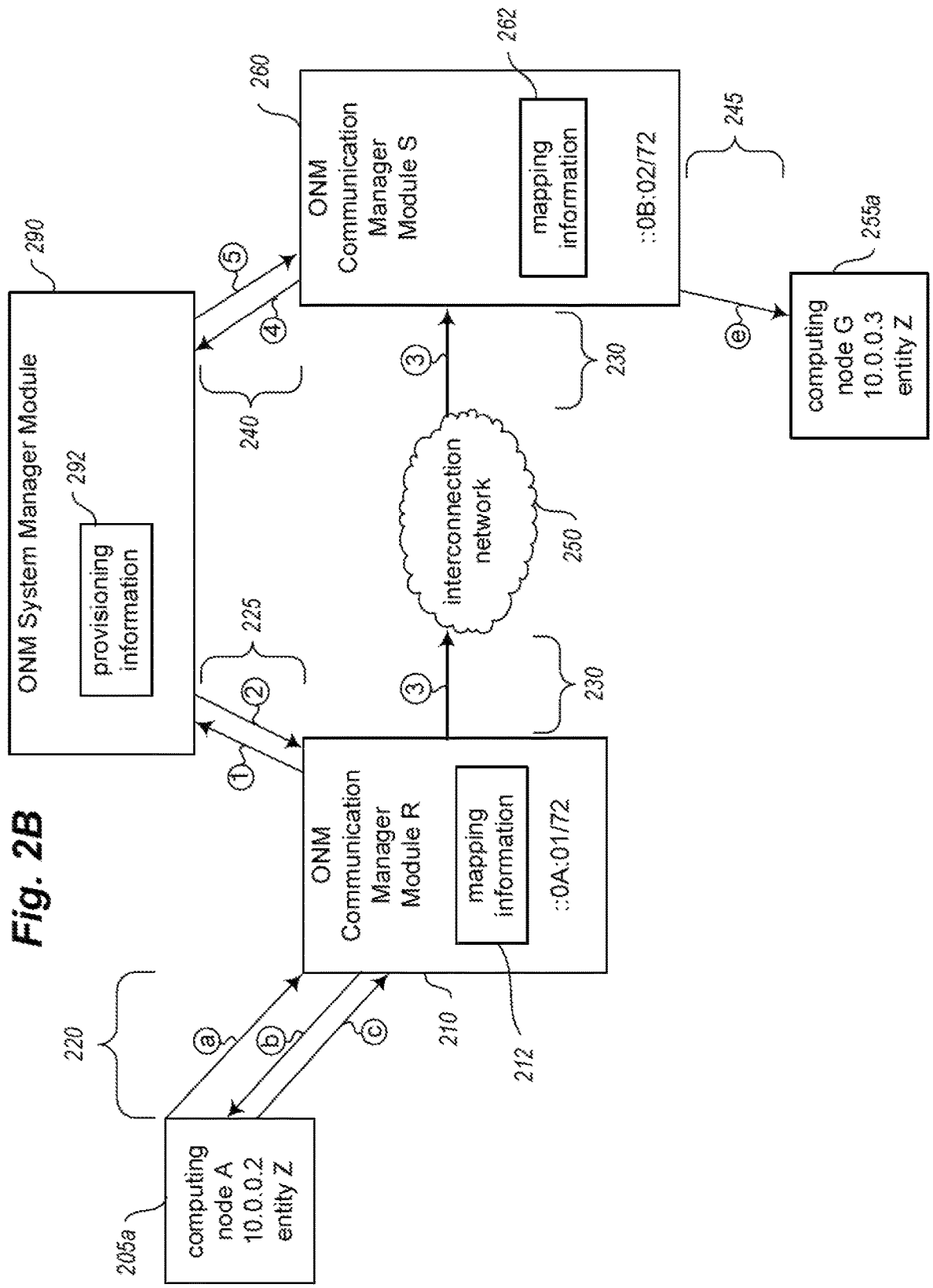
Figure 2C:
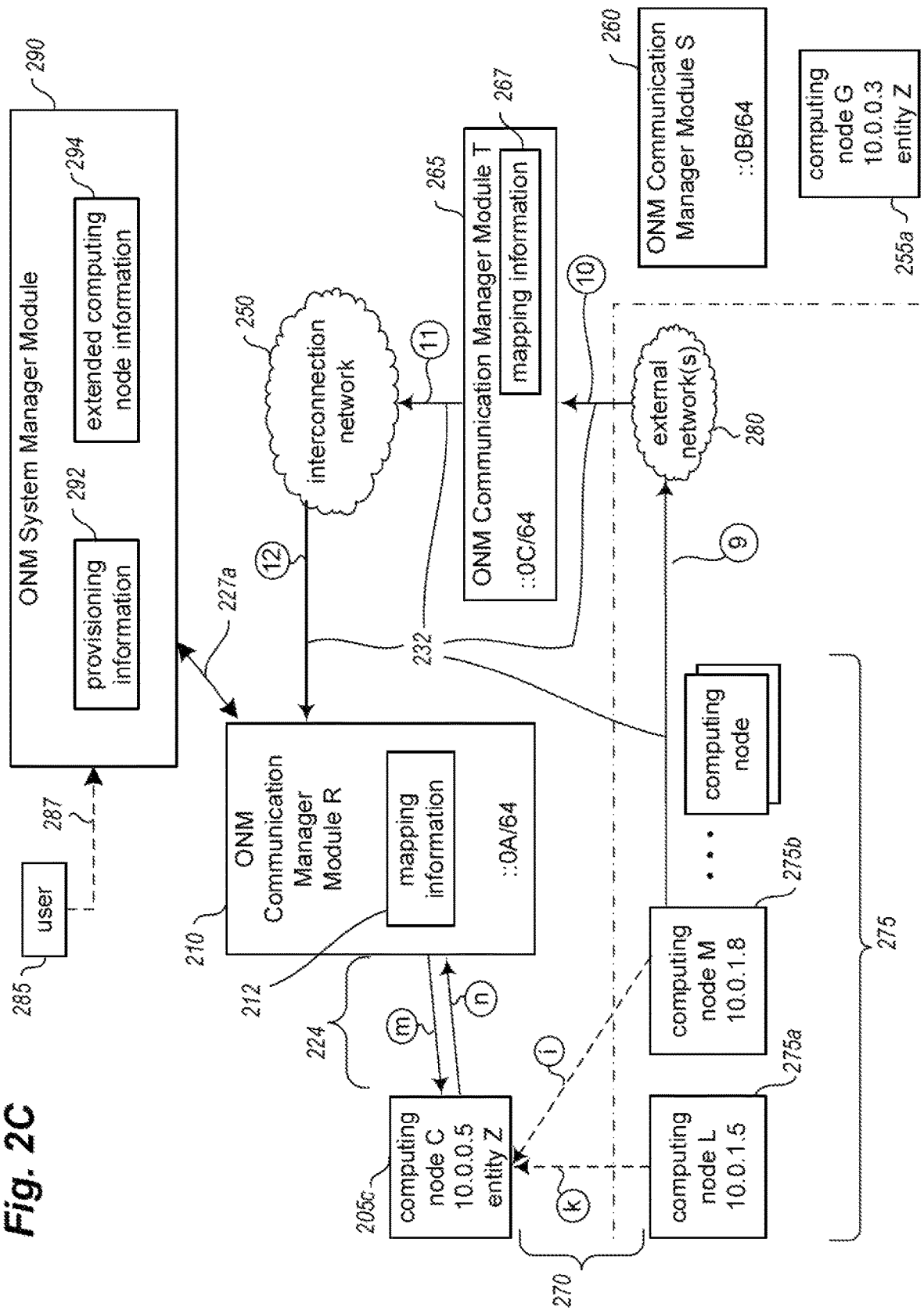
Figure 2D:
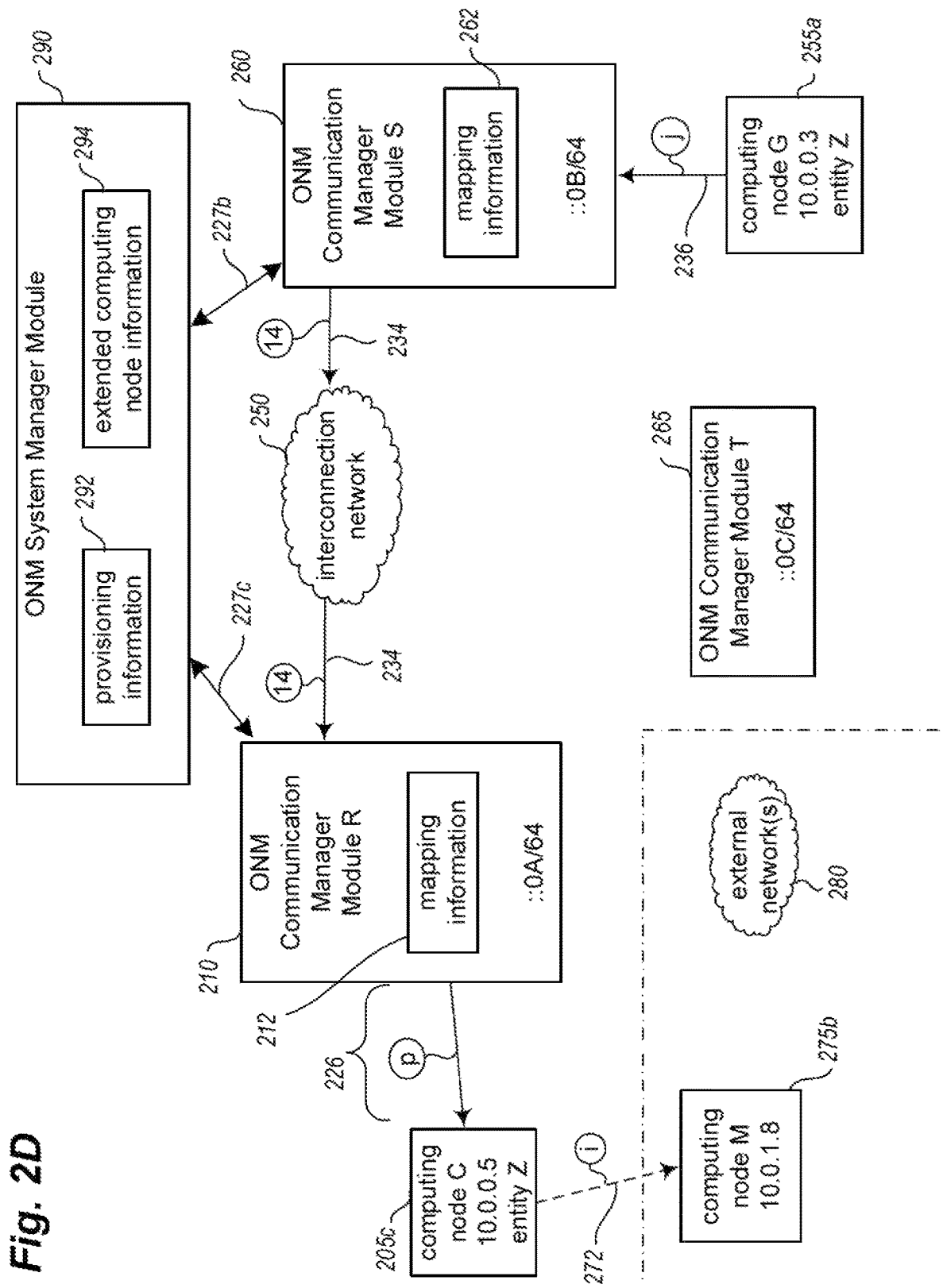

FIGS. 2A-2D illustrate further examples with additional illustrative details related to managing communications between computing nodes that occur via an overlay network over one or more physical networks, such as may be used by the computing nodes and networks of FIG. 1 or in other situations. In particular, FIG. 2A illustrates various example computing nodes 205 and 255 that may communicate with each other by using one or more intermediate interconnection networks 250 as a substrate network. In this example, the interconnection network 250 is an IPv6 substrate network on which IPv4 virtual computer networks are overlaid, although in other embodiments the interconnection network 250 and overlay virtual computer networks may use the same networking protocol (e.g., IPv4). In addition, in this example embodiment, the computing nodes are operated on behalf of multiple distinct entities, and a System Manager module 290 manages the association of particular computing nodes with particular entities and virtual computer networks, and tracks various configuration information specified for the virtual computer networks. The example computing nodes of FIG. 2A include three computing nodes executed on behalf of an example entity Z and part of a corresponding virtual computer network provided for entity Z, those being computing nodes 205a, 205c and 255a. In addition, other computing nodes are operated on behalf of other entities and belong to other provided virtual computer networks, such as computing node 205b.

In this example, the computing nodes 205 are managed by and physically connected to an associated Communication Manager module R 210, the computing nodes 255 are managed by and physically connected to an associated Communication Manager module S 260, and the ONM Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system. For example, with reference to FIG. 1, computing nodes 205 may represent the virtual machines 107a, and computing nodes 255 may represent the virtual machines 107d. If so, Communication Manager module R may correspond to Communication Manager module 109a of FIG. 1, Communication Manager module S would correspond to Communication Manager module 109d of FIG. 1, the interconnection network 250 would correspond to interconnection network 120 of FIG. 1, and the System Manager module 290 would correspond to System Manager module 110 of FIG. 1. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

Each of the Communication Manager modules of FIG. 2A is associated with a group of multiple physical substrate network addresses, which the Communication Manager modules manage on behalf of their associated computing nodes. For example, Communication Manager module R is shown to be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA: 01FF: FFFF:FFFF:FFFF (representing 2 to the power of 56 unique IPv6 addresses), where each "X" may represent any hexadecimal character that is appropriate for a particular situation (e.g., with the initial 64 bits corresponding a particular organization and network topology, as discussed in greater detail with respect to FIG. 2E). The interconnection network 250 will forward any communication with a destination network address in that range to Communication Manager module R—thus, with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c and 255a are part of a single virtual computer network for entity Z, and have assigned IPv4 virtual network addresses of "10.0.0.2", "10.0.0.5" and "10.0.0.3", respectively. Because computing node 205b is part of a distinct virtual computer network for entity Y, it can share the same virtual network address as computing node 205a without confusion. In this example, computing node A 205a wants to communicate with computing node G 255a, which it believes is part of a common local physical network with computing node A, as the interconnection network 250 and Communication Manager modules are transparent to computing nodes A and G in this example. In particular, despite the physical separation of computing nodes A and G, the Communication Manager modules 210 and 260 operate so as to overlay the virtual computer network for entity Z over the physical interconnection network 250 for communications between those computing nodes, so that the lack of an actual local network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding IPv6 actual physical substrate network addresses, with each of the virtual hardware addresses also corresponding to an IPv4 virtual network address for a particular entity's virtual network. If the local store 212 does not contain an entry for computing node G (e.g., if none of the computing nodes 205 have previously communicated with computing node G, if a prior entry in local store 212 for computing node G has expired based on an associated expiration time, etc.), the Communication Manager module R interacts 225 with System Manager module 290 to obtain the corresponding actual IPv6 physical substrate network address for computing node G on behalf of computing node A. In particular, in this example, the System Manager module 290 maintains provisioning information 292 that identifies where each computing node is actually located and to which entity and/or virtual computer network the computing node belongs, such as by initiating execution of programs on computing nodes for entities and virtual computer networks or by otherwise obtaining such provisioning information. As discussed in greater detail with respect to FIG. 2B, the System Manager module determines whether the request from Communication Manager module R on behalf of computing node A for computing node G's actual IPv6 physical substrate network address is valid, including whether computing node A is authorized to communicate with computing node G, and if so provides that actual IPv6 physical substrate network address.

Communication Manager module R receives the actual IPv6 physical substrate network address for computing node G from the System Manager module 290, and stores this received information as part of a new entry for computing node G as part of mapping information 212 for later use (optionally with an expiration time and/or other information). In addition, in this example, Communication Manager module R determines a dummy virtual hardware address to be used for computing node G (e.g., by generating an identifier that is locally unique for the computing nodes managed by Communication Manager module R), stores that dummy virtual hardware address in conjunction with the received actual IPv6 physical substrate network address as part of the new mapping information entry, and provides the dummy virtual hardware address to computing node A as part of response message 220-b. By maintaining such mapping information 212, later communications from computing node A to computing node G may be authorized by Communication Manager module R without further interactions with the System Manager module 290, based on the use of the dummy virtual hardware address previously provided by Communication Manager module R. In other embodiments, the hardware address used by Communication Manager module R for computing node G may instead not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network. Furthermore, in other embodiments the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, the returned IPv6 actual physical substrate network address corresponding to computing node G in interactions 225 is "::013:02:<Z-identifier>10.0.0.3", where "10.0.0.3" is stored in the last 32 bits of the 128-bit IPv6 address, and where "<Z-identifier>" is a 24-bit entity network identifier for computing node G corresponding to the virtual computer network for entity Z (e.g., as previously assigned by the System Manager module to that network to reflect a random number or some other number corresponding to the entity). The initial 72 bits of the IPv6 network address store the "::0B:02" designation, corresponding to the sub-network or other portion of the interconnection network with a network address range of "::0B:02/72" to which Communication Manager module S corresponds— thus, a communication sent over the interconnection network 250 to IPv6 destination network address "::0B:02:<Z-identifier>10.0.0.3" will be routed to Communication Manager module S. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual network, etc.). Additional details related to an example configured IPv6 actual physical network address for use with an overlay virtual computer network are described with respect to FIG. 2E.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the IPv6 actual physical substrate network address corresponding to that virtual destination hardware address from mapping information 212. As previously noted, the IPv6 actual physical substrate network address in this example is "::0B:02:<Z-identifier>10.0.0.3", and Communication Manager module R creates a new IPv6 header that includes that actual physical substrate network address as the destination address. Similarly, the Communication Manager module R extracts the virtual source network address and virtual source hardware address for computing node A from the header of the received communication, obtains an IPv6 actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new IPv6 header. In this example, the IPv6 actual physical substrate network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new IPv6 header (e.g., in accordance with SIIT), including populating the new IPv6 header with other information as appropriate for the communication (e.g., payload length, traffic class packet priority, etc.). Thus, the communication 230-3 includes the same content or payload as communication 220-c, without encapsulating the communication 220-c within the communication 230-3. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same virtual computer network or are associated with the same entity or are otherwise authorized to inter-communicate, based on an interaction with System Manager module 290 to obtain an authorization determination for the communication, etc.).

After Communication Manager module R forwards the modified communication 230-3 to the interconnection network 250, the interconnection network uses the physical IPv6 destination network address of the communication to route the communication to Communication Manager module S. In doing so, the devices of the interconnection network 250 do not use the portion of the destination network address that includes the embedded entity network identifier or embedded virtual network address, and thus do not need any special configuration to forward such a communication, nor even awareness that a virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then forwards communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A, and then modifies communication 245-f to create communication 230-6 by generating a new IPv6 header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header using mapping information 212. Communication Manager module R then forwards response communication 220-d to computing node A. In other embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may intercommunicate using a IPv4-based virtual computer network, without any special configuration of those computing nodes to handle the actual intervening IPv6-based substrate interconnection network, and interconnection network 250 may forward IPv6 communications without any special configuration of any physical networking devices of the interconnection network, based on the Communication Manager modules overlaying the virtual computer network over the actual physical interconnection network without encapsulation of communications and on using embedded virtual network addresses in the substrate physical network addresses.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling networking Layer 2 raw encapsulated communications. Similarly, for link-local broadcast and multicast communications, a special multicast group/64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without re-headering of the additional communication to use an IPv6 header since the communication will not travel over the interconnection network.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a virtual computer network for that entity, and may further have one or more other non-managed computing systems (e.g., computing systems that are directly connected to the interconnection network 250 and/or that natively use IPv6 network addressing) that do not have an associated Communication Manager module that manages their communications. If the entity desires that those non-managed computing systems be part of that virtual computer network, various actions may be taken to configure one or more network computing nodes to act as virtual forwarder nodes in order to extend network capabilities to those non-managed computing systems, as described in greater detail elsewhere. Alternatively, even if the non-managed computing systems are not treated as part of the virtual computer network via capabilities extended by one or more virtual forwarder nodes, the non-managed computing systems may nonetheless be configured to communicate with the managed computing nodes of the virtual computer network in at least some such embodiments. For example, in such situations, if such a non-managed computing system is provided with an actual IPv6 destination network address for such a managed computing node (e.g., "::0A:01:<Z-identifier>10.0.0.2" for managed computing node A in this example), the non-managed computing system may send communications to computing node A via interconnection network 250 using that destination network address, and Communication Manager module R would forward those communications to computing node A (e.g., optionally after re-headering the communications in a manner similar to that previously described) if Communication Manager module R is configured to accept communications from that non-managed computing system (or from any non-managed computing system). Furthermore, Communication Manager module R may generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual computer networks may be configured to allow communications with other devices that are not part of the virtual computer network, such as other non-managed computing systems or other types of network appliance devices that do not have an associated Communication Manager module that manages their communications. In such situations, if the managed computing nodes and/or the virtual computer network is configured to allow communications with such other non-managed devices, such a non-managed device may similarly be provided with the actual IPv6 destination network address for such a computing node (e.g., "::0A:01:<Z-identifier>10.0.0.2" for computing node A in this example), allowing the non-managed device to send communications to computing node A via interconnection network 250 using that destination network address, with Communication Manager module R then forwarding those communications to computing node A (e.g., optionally after re-headering the communications in a manner similar to that previously described). Furthermore, Communication Manager module R may similarly manage outgoing communications from computing node A to such a non-managed device to allow computing node A to send such communications.

In addition, as previously noted, a communication manager module manages communications for associated computing nodes in various ways, including in some embodiments by assigning virtual network addresses to computing nodes of a virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses and/or substrate physical network addresses to particular computing nodes of the virtual network. In such embodiments, the communication manager module obtains such configuration information from the virtual network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with System Manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A, which in this example is "::0A:01:<Z-identifier>10.0.0.2". As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in response message 240-5 matches the source IPv6 network address extracted from the header of communication 230-3, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIG. 2C illustrates a further example of managing ongoing communications for the virtual computer network described with respect to FIGS. 2A and 2B, but with communications being managed to support extending capabilities of a virtual computer network to other extended computing nodes that are not managed by the ONM system. In particular, FIG. 2C illustrates computing nodes C and G, Communication Manager modules R and S, System Manager module 290, and interconnection network 250 in a manner similar to that shown in FIG. 2A, although Communication Manager modules R and S are associated with the IPv6 network address ranges of "::0A/64" and "::0B/64", respectively, rather than "::0A:01/72" and "::0B:02/72" as in FIG. 2A. In addition, FIG. 2C further illustrates additional computing nodes 275 that are not managed by the ONM system and that are external to a first location depicted in FIG. 2A at which the computing nodes 205 and 255, interconnection network 250 and ONM system modules 290, 210, 260 and 265 are located. The additional computing nodes 275 are physically connected to an external network 280 (although the physical connections are not shown), and a new Communication Manager module T 265 is shown that manages communications between managed computing nodes at the first location and external computing nodes.

In the example of FIG. 2C, computing node C 205c is configured to act as a virtual forwarder node for entity Z's managed virtual computer network, and external computing node L 275a and M 275b are configured to act as extended computing nodes that are associated with virtual forwarder node 205c. For example, computing node L has been assigned an associated virtual network address "10.0.1.5" for the managed virtual computer network, and computing node M has been assigned an associated virtual network address "10.0.1.8" for the managed virtual computer network, such as by a user 285 associated with entity Z or by a DHCP server (not shown) for the managed virtual computer network. In the illustrated embodiment, the user 285 further performs interactions 287 with the System Manager module 290 to specify information about virtual forwarder node 205c and/or about extended computing nodes 275a and 275b, such as may be stored as part of extended computing node information 294. Such user-specified configuration information may include, for example, one or more of the following: that computing node 205c is a virtual forwarder node for the managed virtual computer network; that computing nodes L and M are assigned their respective virtual network addresses; that computing nodes L and M are associated with virtual forwarder node 205c; etc. In other embodiments, however, the user 285 may not perform such interactions 287, and the ONM system modules may instead dynamically discover and use such information about virtual forwarder node 205c and/or about extended computing nodes 275a and 275b.

In the example of FIG. 2C, computing nodes L and M each initiate one or more communications to one or more network computing nodes of the managed virtual computer network, and are configured to send those communications to virtual forwarder computing node 205c. For example, computing node M first determines to initiate a communication to computing node G, but is configured to forward that communication to the virtual forwarder computing node 205c. While that communication from computing node M to intermediate destination virtual forwarder computing node 205c is logically represented as communication 270-i, the actual communication path from computing node M to virtual forwarder computing node 205c in this example is shown by communication 232, and involves passing through the external network 280, Communication Manager Module T, interconnection network 250, and Communication Manager Module R.

Computing node M may be configured to forward a communication that is intended for ultimate destination network computing node G via virtual forwarder computing node 205c in various manners in various embodiments. For example, virtual forwarder computing node C 205c has an associated substrate network address of "::0A:01:<Z-identifier>:10.0.0.5" in this example for communications that are sent to computing node C as the ultimate destination, in a manner similar to that previously described in FIG. 2A with respect to computing node A 205a, but may also have other associated substrate network addresses that direct communications to virtual forwarder computing node C 205c for forwarding to other network computing nodes. In particular, as described in greater detail with respect to FIG. 2E, substrate network addresses of the form "::0A:0E:<Z-identifier>:<XYZ>" will be forwarded to virtual forwarder computing node C 205c, where "<XYZ>" can be any 32-bit IPv4 network address, if virtual forwarder computing node C 205c is treated as being in slot position 3 by Communication Manager Module R. Accordingly, if the external network 280 is an IPv6 network, computing node M may be configured with a network address for computing node G that is "::0A:0E:<Z-identifier>10.0.0.3," which will direct a communication with that destination network address to virtual forwarder node 205c, but indicate to it that the ultimate destination of the communication is the network computing node with the virtual network address of "10.0.0.3" (i.e., computing node G in this example). Alternatively, if the external network 280 is an IPv4 network, for example, computing node M may be configured to use a network address for computing node G that is an IPv4 public network address assigned for use by the ONM system, which will direct a communication with that destination network address to Communication Manager Module T, and Communication Manager Module T may use an association of that public network address to the substrate network address "::0A:0E:<Z-identifier>10.0.0.3" (e.g., as stored in mapping information 267) to re-write the communication header for the substrate interconnection network 250 in a manner similar to that described elsewhere.

In a similar manner, computing node M may be configured to use a virtual network address for itself with communication 232 that includes information for use in responding to computing node M. For example, the Communication Manager modules may use a substrate network address for computing node M of the form "::0A:0E:<Z-identifier>10.0.1.8," which will direct a communication with that destination network address to virtual forwarder node 205c, but indicate to it that the ultimate destination of the communication is the computing node with the virtual network address of "10.0.1.8" (i.e., computing node M in this example). In a manner similar to that previously noted, computing node M may directly use such a substrate network address for itself in this example if the external network 280 is an IPv4 network, or instead may use its IPv4 virtual network address of "10.0.1.8" if Communication Manager module T is configured to replace that virtual network address with the corresponding substrate network address for computing node M.

When Communication Manager Module R receives incoming communication 232-12 from the interconnection network 250 with the destination substrate network address of "::0A:0E:<Z-identifier>:10.0.0.3," it handles the incoming communication in a manner similar to that previously described in FIGS. 2A and 2B. In particular, in at least some embodiments, the Communication Manager module R verifies that communication 232-12 is legitimate and authorized to be forwarded to computing node C, such as via one or more interactions 227a with the System Manager module. If the communication 232-12 is determined to be authorized (or if the authorization determination is not performed), the Communication Manager module R then modifies communication 232-12 as appropriate and forwards the modified communication to computing node C. However, rather than using the IPv4 network address of "10.0.0.3" that is embedded in the destination substrate network address to identify computing node C as the destination node, Communication Manager module R instead uses a slot value and other I/G and U/L bits to identify computing node C, as described in greater detail with respect to FIG. 2E. In other embodiments, information about such intermediate destination virtual forwarder nodes and ultimate destination network computing nodes, and about the source extended computing node, may be stored in the communication and used by the Communication Manager module R in other manners, such as in other parts of the header of communication 232-12.

To modify communication 232-12, Communication Manager module R retrieves information from mapping information 212 that corresponds to computing node C, including a virtual hardware address used by computing node C. Communication Manager module R then creates communication 224-m by modifying communication 232-12 so as to replace the prior IPv6 header with a new IPv4 header (e.g., in accordance with SIIT). The new IPv4 header includes the virtual hardware address for computing node C as the destination hardware address for the new IPv4 header, but optionally may include the virtual network address "10.0.0.3" from the destination substrate network address as the destination virtual network address for the new IPv4 header, such as if virtual forwarder node C is configured to manage such communications in a manner similar to a network router. The new IPv4 header may further include the virtual network address and a virtual hardware address for computing node M as the source network address and source hardware address for the new IPv4 header, such as based on the source address information specified by computing node M for communication 232, and includes other information as appropriate for the communication (e.g., total length, header checksum, etc.). The virtual hardware address used by Communication Manager module R for computing node M may, for example, be a dummy hardware address generated by Communication Manager module R for computing node M, or in other embodiments may instead be based on source hardware address information specified by computing node M for communication 232.

After receiving communication 224-m, computing node C determines to forward the received communication on to the ultimate destination computing node G, such as based on the destination virtual network address used for communication 224-m, and accordingly forwards the received communication on its way to computing node G as outgoing communication 224-n. As discussed elsewhere, the virtual forwarder node 205c may in some embodiments modify the header of communication 224-n before forwarding it, such as in a manner similar to a network router (e.g., to replace its own destination hardware address with a destination hardware address corresponding to computing node G). In addition, while the ongoing path of communication 224-n to its ultimate destination of computing node G is not illustrated in this example, along with the corresponding actions of Communication Manager modules R and S, the communication will be handled in the same manner as communication 220-c of FIG. 2A. The actual paths of the one or more logical communications 270-k sent by computing node L to one or more managed network computing nodes via virtual forwarder computing node C are not shown in this example, but may occur in a manner similar to that shown for logical communications 270-i. Alternatively, in some embodiments, virtual forwarder node 205c may have a separate communication path to computing nodes L and M that does not involve the interconnection network 250 (e.g., a separate network shared by computing nodes C, L and M, not shown, or a dialup or other direct connection between the computing nodes), and if so the initial forwarding of communications from computing nodes L and M to virtual forwarder node 205c may occur along that separate communication path, before being forwarded over the interconnection network 250 by virtual forwarder node 205c.

In addition, as previously discussed, Communication Manager module R may be configured to take particular actions to support virtual forwarder node 205c in exchanging communications with extended computing nodes L and M. For example, as previously noted, the Communication Manager module R may be configured to enable communications such as 232-12 to be forwarded to virtual forwarder node 205c, even though the embedded IPv4 virtual network address does not correspond to computing node C. Similarly, with respect to forwarded outgoing communication 224-*n*, Communication Manager module R may be configured to enable communications such as 224-*n* to be forwarded by virtual forwarder node 205*c* to other managed network computing nodes, even though the IPv4 header source network address and/or source hardware address do not correspond to computing node C. In some embodiments, Communication Manager module R may be configured to enable some or all such communications only if the other address information in the communications corresponds to an extended computing node that is previously associated with the virtual forwarder node 205*c*, while in other embodiments Communication Manager module R may be configured to enable some or all such communications without any such previous associations. For example, if user 285 does not perform interactions 287 to specify configuration information for the managed virtual computer network, Communication Manager module R may dynamically learn that computing node C is acting as a virtual forwarder node and that computing node M is an extended computing node associated with virtual forwarder node 205*c* based on one or more received communications such as communication 232, and may further optionally notify the System Manager module 290 of the learned information for storage with information 294.

FIG. 2D continues the example of FIG. 2C with respect to managing ongoing communications for the managed virtual computer network so as to support extending capabilities of the managed virtual computer network to extended computing nodes L and M, but illustrates an example of a managed network computing node initiating an outgoing communication to an extended computing node via the virtual forwarder node 205*c*. In particular, computing node G determines to send a new communication 236-*j* to extended computing node M (e.g., at some point after computing node M sent one or more communications to computing node G as discussed with respect to FIG. 2C, such as by using computing node M's virtual network address of "10.0.1.8" as supplied in the previous communications from computing node M, or instead as otherwise provided to computing node G). As previously noted, computing node G may be unaware that computing node M is an extended computing node and is not managed by the ONM system, and may further be unaware that communication 236-*j* will be routed to virtual forwarder 205*c* as an intermediate destination before being forwarded to computing node M.

In order for computing node G to send communication 236-*j* to extended computing node M in this example, computing node G and associated Communication Manager module S may perform various operations in a manner similar to computing node A and Communication Manager module R of FIG. 2A with respect to communication 220-*c*. For example, while not illustrated in FIG. 2D, computing node G may first exchange an ARP message request that includes the virtual network address for computing node M (i.e., "10.0.1.8") and that requests the corresponding hardware address for computing node M. Communication Manager module S intercepts the ARP request, and responds to computing node G with a spoofed ARP response message that includes a virtual hardware address for computing node M. To obtain the virtual hardware address for computing node M to use with the response message, the Communication Manager module S first checks a local store 262 of information that maps virtual hardware addresses to corresponding IPv6 actual physical substrate network addresses, which may contain a virtual hardware address for computing node M based on the previously sent communication 224-*n* of FIG. 2C. If the local store 262 does not contain an entry for computing node M, however, the Communication Manager module S interacts 227*b* with System Manager module 290 to obtain the corresponding actual IPv6 physical substrate network address for computing node M on behalf of computing node G (e.g., based on configuration information previously specified by user 285 via interactions 287 of FIG. 2C, or based on information learned and supplied by Communication Manager module R to the System Manager module 290 in FIG. 2C), and further receives or otherwise determines a hardware address that represents computing node M.

Thus, computing node G thus includes a destination hardware address for computing node M in communication 236-*j*, such as may have been previously provided by Communication Manager module S. In addition, the header of communication 236-*j* includes a destination network address for destination computing node M that is "10.0.1.8", a source network address for sending computing node G that is "10.0.0.3", and a source hardware address for sending computing node G that is an actual or dummy hardware address that was previously identified to computing node G. Communication Manager module S intercepts the communication 236-*j*, modifies the communication as appropriate, and forwards the modified communication 234-14 over the interconnection network 250 to virtual forwarder computing node C 205*c*. In particular, Communication Manager module S extracts the virtual destination network address and virtual destination hardware address for computing node M from the header, retrieves the IPv6 substrate network address corresponding to that virtual destination hardware address from mapping information 262, and then creates a new IPv6 header that includes that substrate network address as the destination address. As previously noted, the physical substrate network address corresponding to computing node M in this example is "::0A:0E:<Z-identifier>:10.0.1.18", which will cause a communication with that destination substrate network address to be forwarded over the interconnection network 250 to virtual forwarder node 205*c*. Thus, the Communication Manager module S creates communication 234-14 by modifying communication 236-*j* so as to replace the prior IPv4 header with the new IPv6 header, including populating the new IPv6 header with other information as appropriate for the communication (e.g., payload length, traffic class packet priority, etc.), and forwards the communication 234-14 to the interconnection network 250.

When Communication Manager module R receives communication 234-14 via the interconnection network 250, it first identifies that the virtual forwarder computing node 205*c* is the intermediate destination for the communication, such as by using a slot value and other I/G and U/L bits to identify computing node C from the destination substrate network address, rather than using the IPv4 network address of "10.0.1.8" that is embedded in the destination substrate network address. Communication Manager module R also optionally verifies that communication 234-14 is legitimate and authorized to be forwarded to computing node C, such as via one or more interactions 227*c* with the System Manager module. In other embodiments, Communication Manager module R may not verify that communication 234-14 is legitimate and authorized to be forwarded to computing node C (e.g., may attempt to make the verification and fail, or may not make the attempt), but may nonetheless forward the communication to computing node C, and in such situations may further optionally learn that the virtual network address associated with the incoming communication (i.e., "10.0.1.8" in this example) is associated with the virtual forwarder node 205c and/or is associated with an extended computing node (e.g., an extended computing node that has not been specified in any previous explicit configuration interactions 287 and/or from which incoming communications such as those described with respect to FIG. 2C have not yet been received). If the communication is determined to be authorized (or if the authorization determination is not performed), the Communication Manager module R then modifies communication 234-14 as appropriate and forwards the modified communication to virtual forwarder computing node C. To modify communication 234-14, Communication Manager module R retrieves information from mapping information 212 that corresponds to computing node C, including a virtual hardware address used by computing node C. Communication Manager module R then creates communication 226-p by modifying communication 234-14 so as to replace the prior IPv6 header with a new IPv4 header (e.g., in accordance with SIIT). The new IPv4 header includes the virtual hardware address for computing node C as the destination hardware address for the new IPv4 header, but optionally may include the virtual network address "10.0.1.8" from the destination substrate network address as the destination virtual network address for the new IPv4 header, such as if virtual forwarder node C is configured to manage such communications in a manner similar to a network router.

After receiving communication 226-p, computing node C determines to forward the received communication on to the ultimate destination computing node M, such as based on the destination virtual network address used for communication 226-p, and accordingly forwards the received communication on its way to computing node G as shown as logical communication 272-i. As discussed elsewhere, the virtual forwarder node 205c may in some embodiments modify the header of the forwarded communication before forwarding it, such as in a manner similar to a network router (e.g., to replace its own destination hardware address with a destination hardware address corresponding to computing node M). In addition, while the path of the forwarded communication to its ultimate destination of computing node M is not illustrated in this example, the communication will be handled in a similar manner but in reverse to that of communication 234 of FIG. 2C that is sent by computing node M. As previously noted, the actual path of the forwarded communication to extended computing node M are not shown in this example, but may occur via the interconnection network 250, or instead as a separate communication path.

In addition, as previously discussed, Communication Manager modules S and R may be configured to take particular actions to support virtual forwarder node 205c in exchanging communications with extended computing nodes L and M. For example, as previously noted, the Communication Manager module R may be configured to enable communications such as 234-14 to be forwarded to virtual forwarder node 205c, even though the embedded IPv4 virtual network address does not correspond to computing node C. Similarly, with respect to the corresponding forwarded communication to computing node M, Communication Manager module R may be configured to enable forwarded communications from virtual forwarder node 205c to be sent to other managed network computing nodes, even though the IPv4 header source network address and/or source hardware address do not correspond to computing node C. In some embodiments, Communication Manager modules R and/or S may be configured to enable some or all such communications only if the other address information in the communications corresponds to an extended computing node that is previously associated with the virtual forwarder node 205c, while in other embodiments Communication Manager modules R and S may be configured to enable some or all such communications without any such previous associations.

In addition, as previously noted, in at least some embodiments and situations a virtual forwarder node may perform additional functionality with respect to the communications that it receives to be forwarded. For example, if extended computing node M and/or other extended computing nodes have the capability to act as a VPN endpoint, virtual forwarder node 205c may act as the corresponding VPN endpoint, so as to further protect communications to and from such extended computing nodes.

Furthermore, while the examples of FIGS. 2C and 2D involve extending capabilities of the managed virtual computer network corresponding to exchanging communications between computing nodes, other types of network capabilities than forwarding communications may similarly be provided to extended computing nodes in other embodiments. For example, if one of the network computing nodes of a managed virtual computer network makes network-accessible services (e.g., print services, storage services, etc.) or network-accessible resources available to other network computing nodes, access to such services and/or resources may similarly be extended to external extended computing nodes via one or more virtual forwarder nodes of the managed virtual computer network.

As previously noted, configuration information that is specified for a virtual computer network may include various information, and the selection of a particular computing nodes for use in a virtual computer network may be performed in various manners in various embodiments, including based at least in part on such configuration information. For example, in some embodiments the selection of a computing node may be based at least in part on a geographical and/or network location of the computing node, such as an absolute location, or instead a location relative to one or more other computing resources of interest (e.g., other computing nodes of the same virtual network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

Various other types of actions than those discussed with respect to FIGS. 2A-2D may be performed in other embodiments, including for types of network addressing protocols other than IPv4 and IPv6.

Figure 2E:
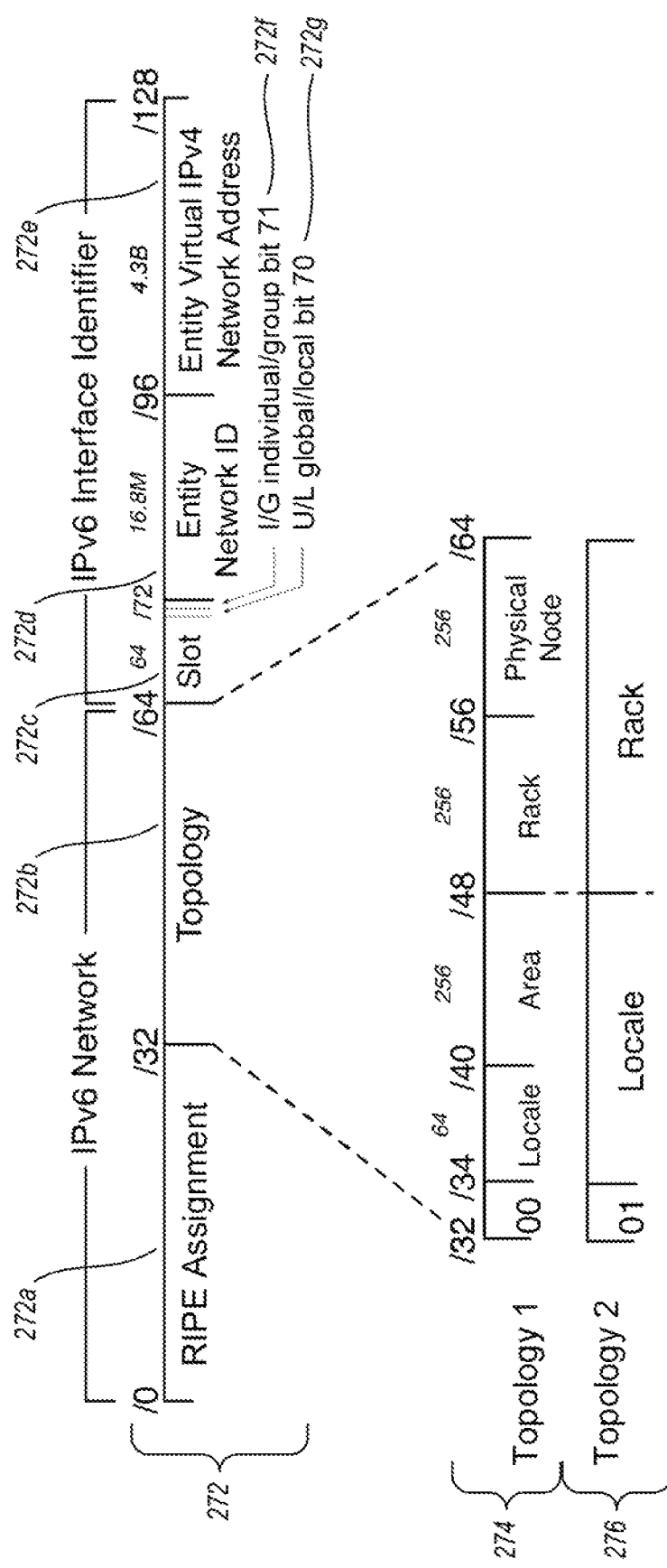
FIG. 2E illustrates an example of configuring underlying substrate network addresses so as to enable embedding of virtual network addresses for an overlay network.

FIG. 2E illustrates an example IPv6 physical substrate network address configuration 272 for use with the described techniques in some embodiments, with the example network address being configured so as to embed a virtual network address and other information in the substrate network address so as to enable an overlay virtual computer network over the substrate computer network. As previously discussed, this example IPv6 network address configuration uses the 128-bit network address space to store various information, with the initial 64 bits storing an IPv6 network portion of the address, and with the subsequent 64 bits storing an interface identifier (or "host") portion of the address.

In this example, the initial 64-bit network portion of the IPv6 address includes a 32-bit identifier 272a for bits 0 through 31 that corresponds to a corporate or other organization identifier assigned to such an organization by an Internet registry operator on behalf of the Internet Assigned Numbers Authority (in this example, based on an assignment from the Regional Internet Registry RIPE NNC, or Réseaux IP Européens Network Coordination Centre). For example, in some embodiments, an organization that operates an embodiment of the ONM system or another organization that uses the described techniques may have an associated identifier 272a. The initial 64-bit network portion of the address also includes a 32-bit group of information 272b in this example that corresponds to topology of a group of multiple computing nodes (e.g., a sub-network or other network portion) provided on behalf of the organization whose identifier is indicated in information 272a. As previously discussed, in at least some embodiments, the initial 64-bit network portion of the address represents a partial network address for the substrate network that corresponds to a location of multiple related computing nodes, such as a sub-network or other portion of the substrate network. In particular, the initial 64-bit network address portion in at least some embodiments corresponds to a particular communication manager module that represents multiple associated computing nodes being managed by the communication manager module, such as based on the communication manager module managing the range of network addresses corresponding to some or all of the 64-bit interface identifier address portion in order to represent the various managed computing nodes. In other embodiments, the partial network address may be represented with a different number of bits (e.g., 72) and/or using a part of the address other than a prefix.

The 32-bit group of topology information 272b may represent various information in various ways in different embodiments, with topology information groups 274 and 276 showing two alternative example configurations of topology information. In particular, in the examples of 274 and 276, the first two bits (bits 32 and 33 of the overall IPv6 address) indicate a particular version of the topology information, such that the meaning of the remaining 30 bits may change over time or in different situations. With respect to example 274, various bits as shown each indicate different geographical locales, geographic areas within the locales, computer racks within the geographic areas, and physical computing system nodes within the computer racks. In this example, the 6 bits for the locale information may represent 64 unique values, the 8 bits for the area information may represent 256 unique values for each locale value, the 8 bits for the rack information may represent 256 unique values for each area value, and the 8 bits for the physical computing system node information may represent 256 unique values for each rack value. Conversely, with respect to example 276, only locale and rack information is shown, but each have additional bits in order to represent those types of information, such as to have 16,384 unique locale values using its 14 bits, and to have 65,536 unique rack values using its 16 bits for each locale value. It will be appreciated that topology information may be represented in other manners in other embodiments.

In this example, the 64-bit interface identifier portion of the IPv6 address is configured to store several types of information, including a 6-bit identifier 272c that corresponds to a particular computing node slot (e.g., a particular virtual machine computing node on a particular physical computing system corresponding to the initial 64-bit network portion of the IPv6 address), two 1-bit identifiers 272f and 272g, a 24-bit identifier 272d to embed an entity network identifier (e.g., to reference a particular virtual computer network), and a 32-bit identifier 272e to embed an IPv4 network address (e.g., a virtual network address). The 6 bits for the slot identifier may represent approximately 64 unique values, the 24 bits for the embedded entity network identifier may represent approximately 16.8 million unique values, and the 32 bits for the embedded IPv4 network address may represent approximately 4.3 billion unique values. In this example, the 1-bit identifier 272g (bit 70 of the IPv6 address) represents a U/L global/local bit that in some embodiments may indicate whether the address is globally administered or locally administered, and the 1-bit identifier 272f (bit 71 of the IPv6 address) represents an I/G individual/group bit that in some embodiments may indicate whether the address corresponds to a single computing node or to a group of multiple computing nodes (e.g., as part of a broadcast or multicast).

In at least some embodiments, the ONM system supports virtual forwarder nodes and corresponding extension of network capabilities by storing relevant information in destination substrate network addresses used with communications that are forwarded over the substrate network to a virtual forwarder node from another network computing node, and that are ultimately intended for an extended computing node that is not part of the managed virtual computer network. For example, for such forwarded communications, the I/G bit 272f is set to zero and the U/L bit 272g is set to one, such as to indicate to a destination communication manager module that the communication be delivered to a computing node managed by the destination communication manager module corresponding to the value of the 6-bit slot identifier 272c rather than a computing node corresponding to the values of the 32-bit IPv4 embedded network address and 24-bit entity network identifier. As described in greater detail with respect to the examples of FIGS. 2C and 2D, use of such information in the destination substrate network address allows the 32-bit IPv4 embedded network address 272e to include a virtual network address corresponding to the intended destination extended computing node, and the 6-bit slot identifier 272c to represent a particular virtual forwarder node that is managed by the destination communication manager module and that will handle the forwarding of the communication to the intended destination extended computing node. It will be appreciated that information regarding a particular intermediary destination computing node such as a virtual forwarder node may be stored in other manners in other embodiments, including in other parts of a network address and/or in other parts of a communication header than a network address, and more generally that the interface identifier information may be represented in other manners in other embodiments.

As previously noted, the ONM system may in at least some embodiments establish and/or maintain virtual computer networks via the operation of one or more communication manager modules at the edge of one or more intermediate physical networks, such as by configuring and otherwise managing communications for the virtual computer networks. In some situations, a communication manager module tracks or otherwise determines the virtual computer networks to which the module's associated computing nodes belong (e.g., based on entities on whose behalf the virtual computer networks operate) as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular virtual computer network to which a computing node belongs, such as if the entity maintains multiple distinct virtual computer networks between different groups of computing nodes. In addition, in at least some embodiments, one or more system manager modules of the ONM system may facilitate configuring communications between computing nodes, such as by tracking and/or managing which computing nodes belong to which virtual computer networks (e.g., based on executing programs on behalf of a customer or other entity), and by providing information about actual physical substrate network addresses that correspond to virtual network addresses used for a particular virtual computer network (e.g., by a particular customer or other entity).

In addition, in at least some embodiments, various information about computing nodes and virtual computer networks may be used by the modules of an ONM system embodiment to determine whether communications between computing nodes are authorized, such as if only authorized communications are delivered or forwarded by communication manager modules (or if unauthorized communications are handled differently from authorized communications in one or more other manners). For example, if a first computing node on a first virtual network attempts to send an outgoing communication to a second computing node on a different second virtual network, and that second virtual network (or the second computing node) has not authorized incoming communications from the first virtual network (or from the first computing node), the first computing node may not be able to even send such a communication onto the one or more intermediate substrate networks between the first and second computing nodes, due to the communication manager module associated with that first computing node blocking such an outgoing communication (e.g., by receiving the outgoing communication from the first computing node but not forwarding the outgoing communication, by preventing the first computing node from obtaining information about one or more addresses for the second computing node that would be used in sending such a communication, etc.). In addition, if an unauthorized communication is sent over an intermediate substrate network to an intended destination computing node (e.g., based on a malicious user being able to gain access to the substrate network), a communication manager module that manages communications for the destination computing node may identify and prevent the unauthorized communication from being forwarded to the destination node.

In at least some embodiments, detection and/or prevention of unauthorized communications may be based at least in part on a topology of the one or more intermediate substrate computer networks on which a virtual computer network is overlaid. In particular, in at least some embodiments, each computing node that is part of a virtual computer network is managed by an associated communication manager module. As described in greater detail with respect to FIGS. 2A-2E and elsewhere, in at least some such embodiments, the physical network address used for such a computing node for communications over the substrate network includes an indication of the computing node's virtual network address, and includes a partial network address for the substrate network that corresponds to a location of the computing node's associated communication manager module (e.g., a sub-network, or "subnet," or other portion of the substrate network for which the communication manager module manages communications). Thus, in order for a malicious user to correctly construct a valid physical substrate network address for a computing node that is part of a virtual network, the malicious user would need to gain access to information about the virtual network to which the computing node belongs, to gain access to information about the topology of the computing node's physical substrate network location in order to determine the partial network address for the associated communication manager module, and to determine how to use that information to construct the physical substrate network address. The validity of constructed physical substrate network addresses may be checked in various ways, such as by identifying a computing node to which a virtual address embedded in a constructed physical network address corresponds, and verifying that a location of that identified computing node corresponds to one of the computing nodes in the portion of the network that corresponds to the partial network address (e.g., one of the computing nodes managed by a communication manager module to which the partial network address corresponds). In addition, the validity of constructed physical network addresses may be checked at various times, such as by a communication manager module that receives an incoming communication intended for a destination computing node (e.g., to verify that the source physical network address is valid), by a system manager module that receives a message purportedly from a communication manager module on behalf of an indicated managed computing node (e.g., a message to request a physical network address for an intended destination computing node of interest), etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network. In addition, in some embodiments, a virtual computer network that is managed by an embodiment of the ONM system may be a configured computer network provided by a configurable network service. In some such embodiments, customers or other users may specify various types of configuration information for their provided configured computer networks, such as network access constraints for the provided computer network, and may interact from one or more remote locations with their provided configured computer networks.

Figure 3:
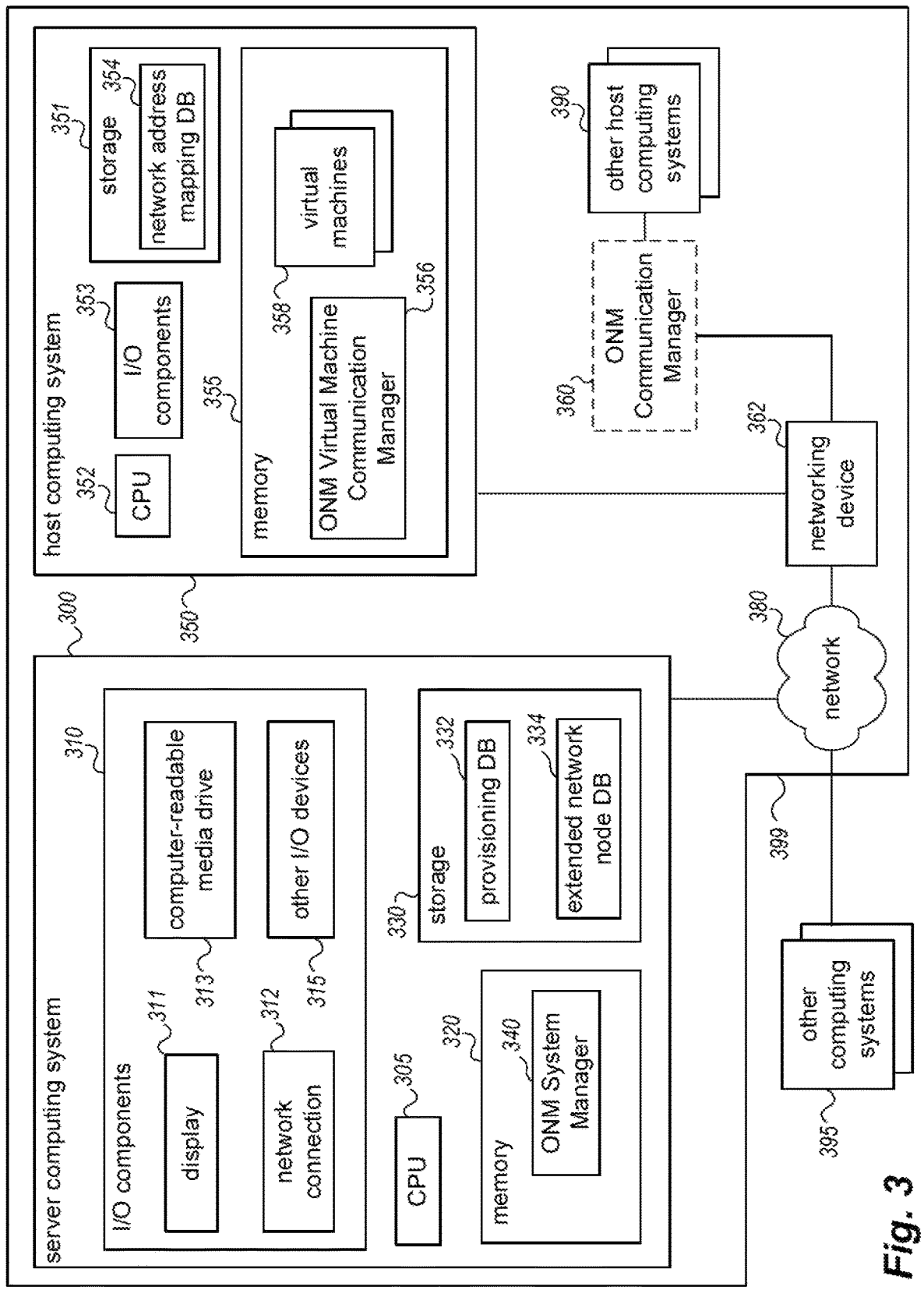
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the ONM system to provide virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The system manager computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge.

The computing system 300 operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358. The Communication Manager module 356 maintains various mapping information 354 on storage related to the computing nodes 358 and other computing nodes, such as in a manner similar to mapping information 212 and 262 of FIGS. 2A-2B. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a System Manager module 340 is executing in memory 320 of the computing system 300. In some embodiments, the System Manager module 340 may receive an indication of multiple computing nodes to be used as part of a virtual computer network (e.g., one or more virtual machine computing nodes on host computing system 350 or one or more computing nodes using one of the host computing systems 390), and in some situations may select the particular computing node(s) for the virtual computer network. In some cases, information about the structure and/or membership of various virtual computer networks may be stored in the provisioning database 332 on storage 330 by the module 340, and provided to the Communication Manager modules at various times. Similarly, in some cases, information about extended computing nodes for one or more virtual computer networks may be tracked by the System Manager module 340 and stored in the extended computing node database 334 on storage 330, such as in a manner similar to extended computing node information 294 of FIGS. 2C and 2D, and provided to the Communication Manager modules at various times.

As discussed in greater detail elsewhere, the Communication Manager modules 356 and 360 (and other Communication Manager modules, not shown, that manage other associated computing nodes, not shown) and the System Manager module 340 may interact in various ways to manage communications between computing nodes, including to support actions of virtual forwarder nodes in extending capabilities of provided virtual computer networks to other extended computing nodes. Such interactions may, for example, enable the computing nodes 358 and/or other computing nodes to inter-communicate over virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
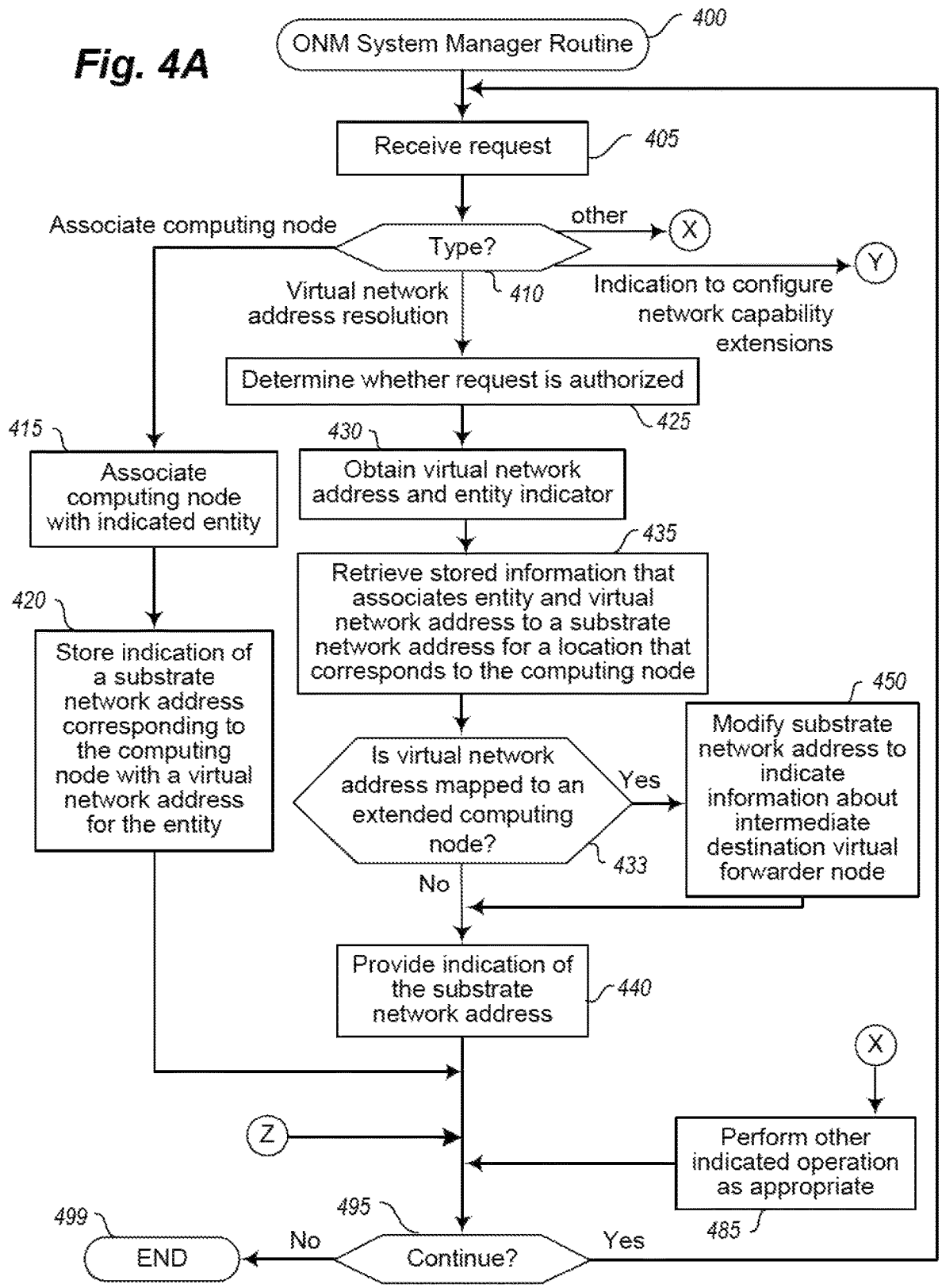
FIGS. 4A-4B illustrate a flow diagram of an example embodiment of an ONM System Manager routine.
Figure 4B:
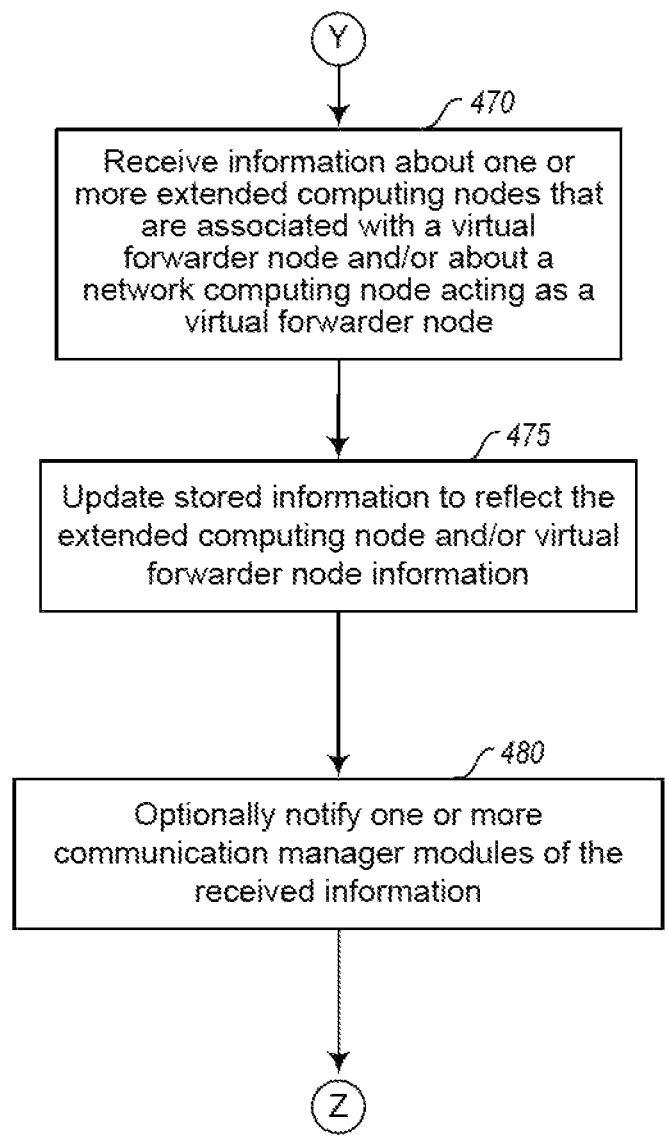

FIGS. 4A-4B are a flowchart of an example embodiment of an ONM System Manager routine 400. The routine may be provided by, for example, execution of the system manager module 110 of FIG. 1, the system manager module 290 of FIGS. 2A-2D, and/or the system manager module 340 of FIG. 3, such as to assist in managing communications between multiple computing nodes across one or more intermediate networks, including to manage communications so as to support actions of virtual forwarder computing nodes in extending capabilities of virtual computer networks to extended computing nodes that are not managed by the ONM system, as well as to perform other types of management operations in some situations. In at least some embodiments, the routine may be provided as part of a system that manages communications for multiple different entities across a common intermediate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular indicated entity and/or virtual computer network of an entity, such as if those computing nodes are to be part of the virtual computer network for the entity (e.g., are executing or are to execute one or more programs on behalf of that entity), the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store an indication of the computing node(s) and their association with the indicated entity and virtual computer network. In particular, in the illustrated embodiment the routine stores an indication of a physical substrate network address corresponding to the computing node, a virtual network address used by the entity for the computing node as part of the virtual computer network, optionally a virtual hardware address assigned to the computing node, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module.

If it is instead determined in block 410 that the type of received request is a request for address resolution for a virtual network address of a computing node or other network device, such as from a communication manager module on behalf of a managed computing node, the routine continues instead to block 425, where it determines whether the request is authorized in one or more ways, such as based on whether the managed computing node on whose behalf the request is made is authorized to send communications to a computing node whose virtual network address resolution is requested (e.g., based on the virtual computer network(s) to which the two computing nodes belong), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a virtual network address of interest for a particular virtual computer network, such as may be identified based on an obtained entity network identifier for the virtual computer network or other indicator of the entity associated with the virtual computer network (e.g., a unique numeric or alphanumeric label), such as included with the request received in block 405. The routine then continues to block 435 to retrieve stored information for the computing node that is associated with the virtual network address for the virtual computer network, and in particular to information that associates that virtual network address to a physical substrate network address for a network location that corresponds to the computing node, such as may be previously stored with respect to block 420, and optionally to other information for the virtual network address (e.g., an associated virtual hardware address).

After block 435, the routine continues to block 433 to determine whether the virtual network address corresponds to an extended computing node that is mapped to or otherwise associated with a virtual forwarder node. If so, the routine continues to block 450 to modify the substrate network address to indicate that the target intermediate destination is a virtual forwarder node, such as by storing information in the substrate network address about the virtual network address for the extended computing node and separately storing other information for use in identifying the virtual forwarder node. After block 450, or if it is instead determined in block 433 that the virtual network address is not for an extended computing node, the routine continues to 440 to provide an indication of the physical substrate network address to the requester. While not illustrated here, if the determination in block 425 determines that the request is not authorized, the routine may instead not perform blocks 430-450 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is to configure information for an indicated virtual computer network regarding one or more extended computing nodes for the virtual computer network, such as from a user associated with that virtual computer network or based on information provided by a communication manager module that dynamically determines the information, the routine continues to block 470 to receive information about one or more extended computing nodes for an indicated virtual computer network that are each associated with an indicated virtual forwarder node for the virtual computer network. In block 475, the routine then updates stored information for the virtual computer network to reflect the extended computing node information. After block 475, the routine continues to block 480 to optionally provide information about the extended computing nodes to one or more communication manager modules for the virtual computer network, such as communication manager modules that manage the virtual forwarder node(s) for the extended computing nodes and/or for other communication manager modules that manage network computing nodes that may communicate with those extended computing nodes.

If it is instead determined in block 410 that the received request is of another type, the routine continues instead to block 485 to perform another indicated operation as appropriate. For example, in some embodiments, the routine may receive requests to update stored information about particular computing nodes, such as if a particular computing node was previously associated with a particular entity and/or virtual computer network but that association ends (e.g., one or more programs being executed for that entity on that computing node are terminated, the computing node fails or otherwise becomes unavailable, etc.). The routine may also perform a variety of other actions related to managing a system of multiple computing nodes, as discussed in greater detail elsewhere. In addition, while not illustrated here, in other embodiments the routine may at times perform actions of other types, such as to perform occasional housekeeping operations to review and update stored information as appropriate, such as after predefined periods of time have expired. In addition, if possible validation problems are detected, such as with respect to received address resolution requests for virtual network addresses, the routine may take various actions to signal an error and/or perform other corresponding actions as appropriate.

After blocks 420, 440, 480 and 485, the routine continues to block 495 to determine whether to continue, such as until an explicit indication to terminate is received. If it is determined to continue, the routine returns to block 405, and if not continues to block 499 and ends.

Figure 5B:
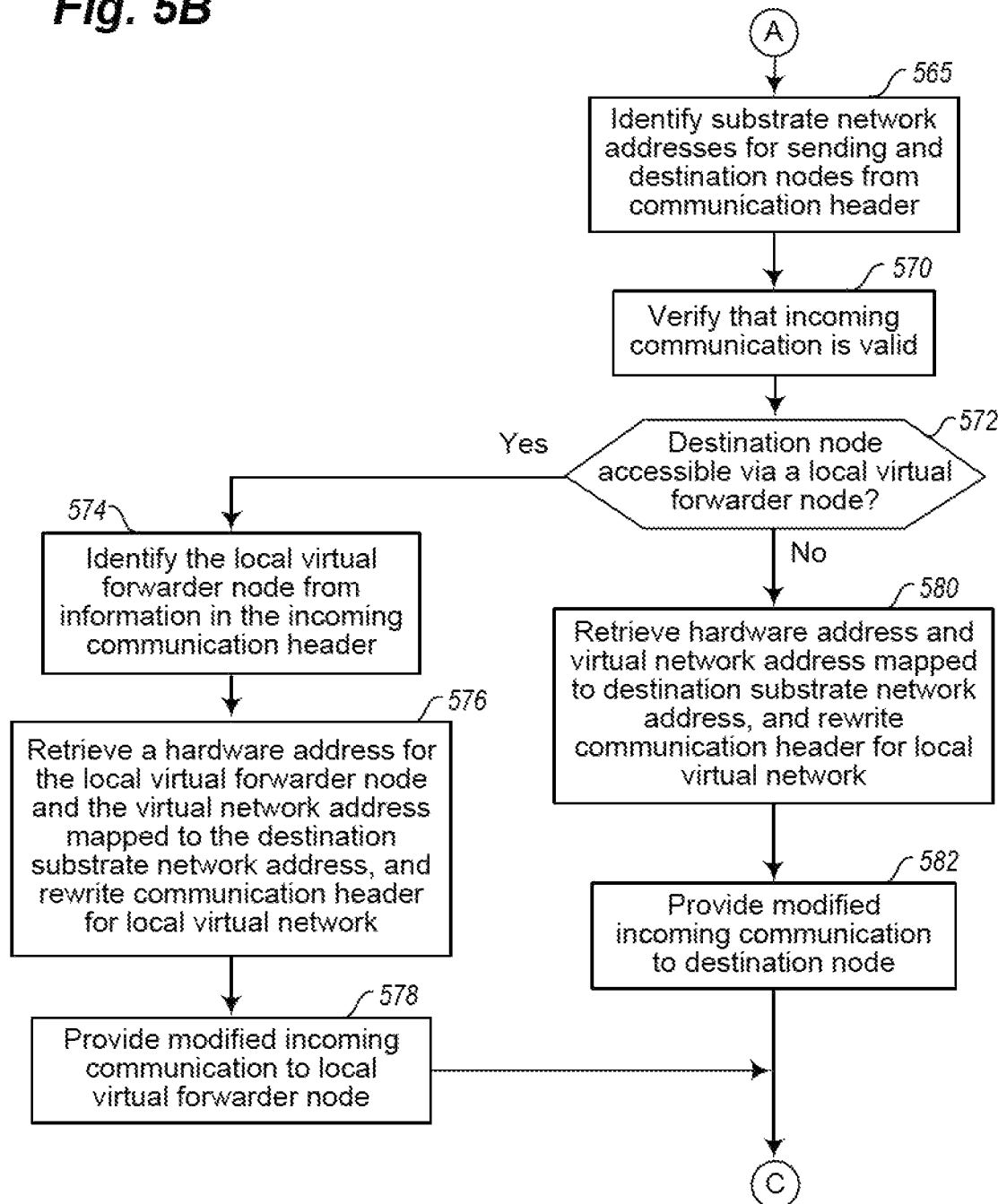

FIGS. 5A-5B are a flow diagram of an example embodiment of an ONM Communication Manager routine 500. The routine may be provided by, for example, execution of the Communication Manager modules 109a, 109b, 109c, 109d and/or 150 of FIG. 1, the Communication Manager modules 210 and/or 260 of FIGS. 2A-2D, and/or the Communication Manager modules 356 and/or 360 of FIG. 3, such as to manage communications to and from an associated group of one or more computing nodes in order to provide a private virtual computer network over one or more shared intermediate networks, including to determine whether to authorize communications to and/or from the managed computing nodes, and to support virtual forwarder nodes of virtual computer networks that extend capabilities of the virtual computer networks to other external extended computing nodes.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request. The request may be initiated by, for example, a managed computing node of a virtual computer network that would like to send a new communication to another computing node of the virtual computer network, or instead a managed computing node that is acting as a virtual forwarder node and would like to forward a communication received from an extended computing node to another ultimate destination computing node of the virtual computer network. The routine then continues to block 520 to send a request to a system manager module for virtual network address resolution for the indicated virtual network address for the virtual computer network associated with the computing node that provided the request, such as discussed with respect to blocks 425-450 of FIGS. 4A-4B. As discussed in greater detail elsewhere, the routine may in some embodiments track information about virtual computer networks and/or entities associated with each managed computing node, as well as managed computing nodes that act as virtual forwarder nodes and have associated extended computing nodes, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated virtual network addresses.

In the illustrated embodiment, the routine next continues to block 525 to receive a response from the system manager module that includes a physical substrate network address and/or other information corresponding to the identified virtual network address (e.g., an indication that the virtual network address corresponds to an extended computing node, such that the response from the system manager module further includes information about a virtual forwarder node of the virtual computer network that is associated with the extended computing node), and stores information locally that maps that physical substrate network address and/or other information to a unique hardware address for later use by the routine (e.g., based on a dummy virtual hardware address generated by the routine or provided in the response). The routine then provides the hardware address to the requesting computing node, which it will use as part of communications that it sends to the computing node with the indicated virtual network address. As discussed in greater detail elsewhere, the physical substrate network address response that is provided may in some embodiments include a physical substrate network address that is specific to the indicated computing node of interest, while in other embodiments the physical substrate network address may correspond to a sub-network or other group of multiple computing nodes to which the indicated computing node belongs, such as to correspond to another communication manager module that manages those other computing nodes. In addition, if the indicated virtual network address corresponds to an extended computing node that is not managed by the ONM system, the physical substrate network address response that is provided may include information corresponding to a virtual forwarder node associated with the extended computing node, such that a communication that uses the physical substrate network address to indicate a destination will be directed to that virtual forwarder node as an intermediate destination, while in other embodiments information about the associated virtual forwarder node for an extended computing node will be indicated and stored separately than the physical substrate network address. The routine then continues to block 530 to determine if blocks 515-525 were performed as part of the handling of an outgoing node communication, as discussed with respect to blocks 540-555, and if so, continues to block 547. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote destination computing node that is not managed by the routine, the routine continues to block 540 to identify the indicated hardware address for the destination computing node from the communication header. In block 545, the routine then determines whether that destination hardware address is a hardware address previously mapped to a physical substrate network address corresponding to the destination computing node, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped address, the routine may cause the outgoing node communication to fail, such as with an error message back to the sending node).

If the indicated hardware address is a mapped address, or the check is not performed, the routine continues to block 547 to determine whether the source information specified for the outgoing communication corresponds to an extended computing node being the initial sending node for the communication, such that the managed computing node that provided the outgoing communication is an intermediary that is acting as a virtual forwarder node for that extended computing node. For example, in at least some embodiments, such a virtual forwarder node will specify the extended computing node's virtual network address as the source network address for the communication, but will use its own hardware address as the source hardware address for the communication, such as in a manner similar to a router device. In other embodiments, a managed computing node acting as a virtual forwarder node will instead include a source hardware address for the communication that is associated with the extended computing node that initiated the communication, such as a source hardware address specified by that extended computing node. If it is determined that the communication was initiated from an extended computing node, the routine continues to block 549. In block 549, the routine optionally sends information to the system manager module to update its information to reflect that the managed computing node is acting as a virtual forwarder node and is associated with the extended computing node that initiated the communication, such as if the routine has not previously stored information corresponding to that extended computing node and its association with the virtual forwarder node. In addition, while not illustrated here, in some embodiments a physical substrate network address corresponding to that extended computing node may not yet be mapped and stored, and if so, the routine may further perform blocks 515-525 in a manner similar to that illustrated with respect to blocks 540 and 545. In other embodiments, the virtual forwarder node will have previously performed a network address resolution request for the extended computing node before forwarding the communication, such that a physical substrate network address for the extended computing node has already been mapped.

After block 549, or if it is instead determined in block 547 that the communication is not being forwarded by a virtual forwarder node, the routine continues to block 550 to retrieve the physical substrate network address that is mapped to the destination hardware address. In block 555, the routine then rewrites the communication header in accordance with a networking address protocol for one or more intermediate networks between the sending and destination computing nodes using the physical substrate network address retrieved in block 550. The header re-writing may further include changing other information in the new header, including changing a virtual network address for the sending computing node to be a corresponding physical substrate network address, and in at least some embodiments includes modifying the received communication without encapsulation as part of an overlay of the virtual computer network over the substrate one or more intermediate physical networks. In block 555, the routine then facilitates providing of the modified outgoing communication to the destination computing node, such as by initiating forwarding of the modified outgoing communication over the substrate intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.).

If it is instead determined in block 510 that the received message is an incoming node communication for one of the managed computing nodes from an external computing node, the routine continues to block 565 to identify the physical substrate network addresses for the sending and destination computing nodes from the communication header. After block 565, the routine continues to block 570 to optionally verify that the incoming communication is valid in one or more ways. For example, the routine may determine whether the physical substrate network address for the sending communication node is actually mapped to a computing node that corresponds to the source physical substrate network address location, such as based on interactions with a system manager module and/or based on other information previously obtained and stored by the routine. In addition, the routine may determine whether the physical substrate network address for the destination communication node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node, or other actions may be taken to support forwarding communications to a moved computing node that was previously supported by the routine.

In the illustrated embodiment, after block 570, the routine continues to block 572 to determine if the intended destination for the incoming communication is an extended computing node that is not managed by the routine, but that is accessible via or otherwise associated with a managed computing node acting as a virtual forwarder node. The determination may be made based at least in part on a destination virtual network address that is specified for the incoming communication (e.g., based on being embedded in the destination substrate network address), based on other information embedded in the destination substrate network address (e.g., a slot number that corresponds to a virtual forwarder node, as described with respect to FIG. 2E), or based on information otherwise included in the communication header. If the intended destination for the incoming communication is determined to be an extended computing node, the routine continues to block 574 to identify the local managed computing node that is acting as a virtual forwarder node for the destination extended computing node, such as based on information that is included with the communication or based on a previous association between the extended computing node and virtual forwarder node. The routine then continues to block 576 to retrieve the hardware address for the virtual forwarder node and the virtual network address for the destination extended computing node (e.g., from the destination substrate network address or other information in the communication header), and to rewrite the communication header for the virtual computer network so that it appears to be sent to a router with that hardware address for eventual delivery to a computing node with that virtual network address. In other embodiments, the hardware address included in the rewritten communication header will instead be a hardware address corresponding to the extended computing node. The destination virtual network address may, for example, be obtained from the destination physical substrate network address itself in some embodiments, such as from a subset of the bits of the destination physical substrate network address. The destination hardware address to use may, for example, have previously been mapped to the physical destination substrate network address, such as previously discussed with respect to block 525, or may be identified based on computing node slot information included in the destination substrate network address. After block 576, the routine continues to block 578 to facilitate providing of the modified incoming communication to the intermediate destination virtual forwarder node.

If it is instead determined in block 572 that the intended destination for the incoming communication is not an extended computing node, the routine continues instead to block 580 to retrieve the hardware address and the virtual network address that are mapped to the physical destination substrate network address, and to rewrite the communication header for the virtual computer network so that it appears to be sent to a computing node with that virtual network address and hardware address. For example, in some embodiments the destination virtual network address may be obtained from the destination physical substrate network address itself, such as from a subset of the bits of the destination physical substrate network address. In addition, the destination hardware address may have previously been mapped to the physical destination substrate network address, such as previously discussed with respect to block 525. In situations in which such prior mapping has not occurred, the routine may instead perform blocks 515-525 to obtain such information. The routine may similarly rewrite the communication header for the virtual computer network so that it appears to be sent from a computing node with a source virtual network address and source hardware address corresponding to the sending computing node. After block 580, the routine continues to block 582 to facilitate providing of the modified incoming communication to the destination computing node, such as by initiating forwarding of the modified incoming communication to the destination node.

If it is instead determined in block 510 that a message of another type is received, the routine continues to block 585 to perform another indicated operation as appropriate, such as to receive and store information about entities associated with particular computing nodes, receive and store information about virtual forwarder nodes for particular virtual computer networks, receive and store information about extended computing nodes associated with particular virtual forwarder nodes, update previously mapped or stored information to reflect changes with respect to computing nodes that are being managed or to remote computing nodes, etc.

After blocks 555, 578, 582, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual computer networks, the configuration of information related to virtual forwarder nodes for virtual computer networks that extend network capabilities to other external extended computing nodes, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the ONM system may be provided in exchange for fees from users or other entities, and if so the mechanisms for customer users and other entities to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of an ONM system are available in U.S. application Ser. No. 12/060,074, filed Mar. 31, 2008 and entitled "Configuring Communications Between Computing Nodes;" which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A system, comprising:
   a configurable network service implemented by one or more hardware processors and associated memory, configured to:
   implement a first computer network of computing nodes, wherein the first computer network is managed by the configurable network service, wherein the computing nodes are implemented as virtual machines hosted on physical hosts of the configurable network service, and wherein communications among the computing nodes are managed by one or more communication managers implemented on the physical hosts;

identify the second computer network of additional computing nodes not managed by the configurable network service; and extend the first computer network to include the additional computing nodes as part of the first computer network, including to:
identify a connection between the first computer network and the second computer network;
create a virtual forwarder node (VFN) in the first computer network, wherein the VFN is configured to (a) route outgoing communications from the first computer network over the connection to the second computer network, and (b) route incoming communications from the second computer network received over the connection to first computer network; and
store extended computing node information about the additional computing nodes of the second computer network, wherein the extended computing node information includes dynamically discovered addresses of one or more of the additional computing nodes in the second computer network and associates the one or more additional computing nodes with the VFN such that based on the extended computing node information, communications corresponding to the one or more additional compute nodes are forwarded via the VFN.

2. The system of claim 1, wherein the connection is a dedicated physical connection between the first computer network and the second computer network.

3. The system of claim 1, wherein the connection is provided by a third party telecommunications infrastructure provider.

4. The system of claim 1, wherein the first computer network is managed on behalf of a client of the configurable network service, and the second computer network is a private network of the client located at a remote location from the first computer network.

5. The system of claim 1, wherein the connection is a virtual private network (VPN) connection and the VFN acts as a VPN endpoint of the VPN.

6. The system of claim 1, wherein individual computing nodes in the first computer network have an IPv4 address and an IPv6 address.

7. The system of claim 1, wherein the communication managers comprise networking devices through which communications to and from the physical hosts travel.

8. The system of claim 1, wherein the communication managers comprise hypervisors executing on the physical hosts.

9. The system of claim 1, wherein the communication managers implement an address resolution protocol (ARP) among the computing nodes of the first computer network.

10. The system of claim 1, wherein the first computer network is implemented according to configuration information received via a graphical user interface (GUI) of the configurable network service, wherein the configuration information indicates:
a geographic location of a group of computing nodes in the first computer network, and
a range of network addresses associated with the group.

11. A method performed by a configurable network service implemented by one or more hardware processors and associated memory, comprising:
implementing a first computer network of computing nodes, wherein the first computer network is managed by the configurable network service, wherein the computing nodes are implemented as virtual machines hosted on physical hosts of the configurable network service, and wherein communications among the computing nodes are managed by one or more communication managers implemented on the physical hosts;
identifying the second computer network of additional computing nodes not managed by the configurable network service; and
extending the first computer network to include the additional computing nodes as part of the first computer network, including:
identifying a connection between the first computer network and the second computer network;
creating a virtual forwarder node (VFN) in the first computer network, wherein the VFN is configured to (a) route outgoing communications from the first computer network over the connection to the second computer network, and (b) route incoming communications from the second computer network received over the connection to first computer network; and
storing extended computing node information about the additional computing nodes of the second computer network, wherein the extended computing node information includes dynamically discovered addresses of one or more of the additional computing nodes in the second computer network and associates the one or more additional computing nodes with the VFN such that based on the extended computing node information, communications corresponding to the one or more additional compute nodes are forwarded via the VFN.

12. The method of claim 11, wherein the connection is a dedicated physical connection between the first computer network and the second computer network.

13. The method of claim 11, wherein the connection is provided by a third party telecommunications infrastructure provider.

14. The method of claim 11, wherein the first computer network is managed on behalf of a client of the configurable network service, and the second computer network is a private network of the client located at a remote location from the first computer network.

15. The method of claim 11, wherein the connection is a virtual private network (VPN) connection and the VFN acts as a VPN endpoint of the VPN.

16. The method of claim 11, wherein individual computing nodes in the first computer network have an IPv4 address and an IPv6 address.

17. The method of claim 11, wherein the communication managers comprise networking devices through which communications to and from the physical hosts travel.

18. The method of claim 11, wherein the communication managers comprise hypervisors executing on the physical hosts.

19. The method of claim 11, wherein the communication managers implement an address resolution protocol (ARP) among the computing nodes of the first computer network.

20. The method of claim 11, wherein the first computer network is implemented according to configuration information received via a graphical user interface (GUI) of the configurable network service, wherein the configuration information indicates:
   a geographic location of a group of computing nodes in the first computer network, and
   a range of network addresses associated with the group.

* * * * *